(12) United States Patent
Jäger

(10) Patent No.: US 11,741,842 B2
(45) Date of Patent: Aug. 29, 2023

(54) VIRTUAL WALL MAPPING FOR AERIAL VEHICLE NAVIGATION

(71) Applicant: GoPro, Inc., San Mateo, CA (US)

(72) Inventor: Andreas Jäger, Zurich (CH)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/959,041

(22) Filed: Oct. 3, 2022

(65) Prior Publication Data
US 2023/0031185 A1 Feb. 2, 2023

Related U.S. Application Data

(63) Continuation of application No. 16/787,144, filed on Feb. 11, 2020, now Pat. No. 11,462,115, which is a
(Continued)

(51) Int. Cl.
*G08G 5/00* (2006.01)
*G05D 1/02* (2020.01)

(52) U.S. Cl.
CPC ........... *G08G 5/006* (2013.01); *G05D 1/0202* (2013.01); *G08G 5/0021* (2013.01); *G08G 5/0052* (2013.01); *G08G 5/0069* (2013.01)

(58) Field of Classification Search
CPC .... G08G 5/006; G08G 5/0021; G08G 5/0052; G08G 5/0069; G05D 1/0202; G05D 1/106
See application file for complete search history.

(56) References Cited

U.S. PATENT DOCUMENTS 9,412,278 B1 * 8/2016 Gong .................... G06F 21/44
9,415,870 B1 8/2016 Beckman
(Continued)

FOREIGN PATENT DOCUMENTS

WO 2016141748 9/2016

OTHER PUBLICATIONS

International Search Report and Written Opinion of International Application No. PCT/US2017/050807 dated Dec. 26, 2017. 4 pages.
(Continued)

*Primary Examiner* — Ian Jen
(74) *Attorney, Agent, or Firm* — Young Basile Hanlon & MacFarlane, P.C.

(57) ABSTRACT

An unmanned aerial vehicle ("UAV"), the UAV including an electronic speed controller and a flight controller. The electric speed controller is interfaced with thrust motors of the UAV. The flight controller is configured to: determine a geographic location and a velocity of the UAV. The flight controller configured to: determine a distance between the geographic location of the UAV and a closest segment of a no-fly-zone. The flight controller in response to the distance being less than a threshold distance, control a speed and thrust applied by the thrust motors through the electric speed controller to reduce both the first component and the second component of the velocity of the UAV based on the distance. The flight controller configured to: override a user input received via a user interface so that the UAV is moved relative to the closest segment of a no-fly-zone according to instructions from the flight controller.

20 Claims, 12 Drawing Sheets

Related U.S. Application Data continuation of application No. 15/621,656, filed on Jun. 13, 2017, now Pat. No. 10,573,188.

(60) Provisional application No. 62/411,612, filed on Oct. 23, 2016, provisional application No. 62/411,611, filed on Oct. 23, 2016.

(56) References Cited

U.S. PATENT DOCUMENTS

| | | |
|---|---|---|
| 10,573,188 B2 | 2/2020 | Jager |
| 10,803,757 B2 | 10/2020 | Jager |
| 11,462,115 B2 | 10/2022 | Jager |
| 2015/0323930 A1 | 11/2015 | Downey |
| 2015/0339931 A1 | 11/2015 | Yu |
| 2016/0069994 A1 | 3/2016 | Allen |
| 2016/0070265 A1 | 3/2016 | Liu |
| 2016/0082460 A1 | 3/2016 | Mcmaster |
| 2016/0117811 A1 | 4/2016 | Tariolle |
| 2016/0124435 A1 | 5/2016 | Thompson |
| 2016/0140851 A1 | 5/2016 | Levy |
| 2016/0235236 A1 | 8/2016 | Byers |
| 2016/0240087 A1 | 8/2016 | Kube |
| 2016/0244187 A1 | 8/2016 | Byers |
| 2016/0247115 A1 | 8/2016 | Pons |
| 2016/0247116 A1 | 8/2016 | Olivo |
| 2016/0253907 A1 | 9/2016 | Taveira |
| 2016/0266579 A1 | 9/2016 | Chen |
| 2016/0292872 A1 | 10/2016 | Hammond |
| 2016/0297545 A1 | 10/2016 | Yang |
| 2016/0307447 A1 | 10/2016 | Johnson |
| 2017/0337831 A1 | 11/2017 | Moore Pitman |
| 2017/0372618 A1 | 12/2017 | Xu |
| 2018/0114447 A1 | 4/2018 | Jager |
| 2018/0114448 A1 | 4/2018 | Jager |
| 2020/0184829 A1 | 6/2020 | Jager |
| 2022/0262259 A9 | 8/2022 | Jager |

OTHER PUBLICATIONS

The Virtual Wall Approach to Limit Cycle Avoidance for Unmanned Ground Vehicles (Year: 2006) 27 pages.

\* cited by examiner

VIRTUAL WALL MAPPING FOR AERIAL VEHICLE NAVIGATION

CROSS REFERENCE TO RELATED APPLICATIONS

This application is a continuation of U.S. patent application Ser. No. 16/787,144, filed Feb. 11, 2020, which claims priority to U.S. patent application Ser. No. 15/621,656, filed Jun. 13, 2017, now U.S. Pat. No. 10,573,188, which claims the benefit of U.S. Provisional Application No. 62/411,612, filed Oct. 23, 2016, and U.S. Provisional Application No. 62/411,611, filed Oct. 23, 2016, both of which are incorporated herein by reference in their entirety.

TECHNICAL FIELD

The disclosure generally relates to the field of remote controlled aerial vehicles, and in particular to the navigation of aerial vehicles in proximity to virtual walls and no-fly zones.

BACKGROUND

Unmanned aerial vehicles (or "UAVs" hereinafter) continue to grow in popularity for both their commercial applications as well as recreational uses by hobbyists. The ability of remote controlled aerial vehicles to quickly traverse space and to access places which a user cannot provides for many useful applications. However, a remote controlled aerial vehicle must, in general, avoid flying into prohibited areas, for example high-security areas, private property areas, areas in which flying presents a possible danger, and the like (collectively referred to herein as "no-fly zones" or "NFZs").

The boundaries of an NFZ can be defined in advance, for instance relative to a map. Each segment of an NFZ boundary can be referred to as a "virtual wall", through which the UAV should be prevented from flying. A user navigating a UAV may not be able to see a boundary of an NFZ, or may not be aware of the existence of an NFZ. Accordingly, there is a need for the UAV to be able to navigate around or otherwise avoid crossing an NFZ threshold or virtual wall without requiring the explicit actions or input from a user.

SUMMARY

The present teachings provide: an unmanned aerial vehicle ("UAV"), the UAV including an electronic speed controller and a flight controller. The electric speed controller is interfaced with thrust motors of the UAV. The flight controller is configured to: determine a geographic location and a velocity of the UAV. The flight controller configured to: determine a distance between the geographic location of the UAV and a closest segment of a no-fly-zone. The flight controller in response to the distance being less than a threshold distance, control a speed and thrust applied by the thrust motors through the electric speed controller to reduce both the first component and the second component of the velocity of the UAV based on the distance. The flight controller configured to: override a user input received via a user interface so that the UAV is moved relative to the closest segment of a no-fly-zone according to instructions from the flight controller.

The present teachings provide: a system including a flight controller. The flight controller includes a navigation engine and a distance evaluation engine. The navigation engine is configured to: determine a set point of an unmanned aerial vehicle (UAV), wherein the set point includes a velocity of the UAV, which includes a first component and a second component corresponding to a no-fly-zone, and identify a state of the set point of the UAV in real time. The distance evaluation engine is configured to: determine a shortest distance between the set point of the UAV and a closest portion of the virtual wall with the distance evaluation engine. The UAV in response to the shortest distance being less than a threshold distance, reducing both the first component and the second component of the velocity of the UAV by controlling a speed and thrust applied by thrust motors of the UAV.

The present teachings provide: an electronic control system including: a flight controller, an electronic speed controller, a gimbal interface, a sensor subsystem, a power subsystem, a camera interface, and a communication subsystem. The flight controller is in communication with an unmanned aerial vehicle (UAV) and including instructions regarding a location, a speed, and a trajectory, wherein the flight controller provide a set point to the UAV. The electronic speed controller in communication with one or more thrust motors and configured to control a speed and thrust of the one or more thrust motors. The gimbal interface in communication with a gimbal and the flight controller to control movements of the gimbal. The sensor subsystem comprising navigational components to determine a location and orientation of the UAV. The power subsystem configured to manage and supply power within the UAV. The camera interface configured to interface with an image capture device. The communication subsystem configured to communicate with a remote controller.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Aerial Vehicle Configuration

Figure 1:
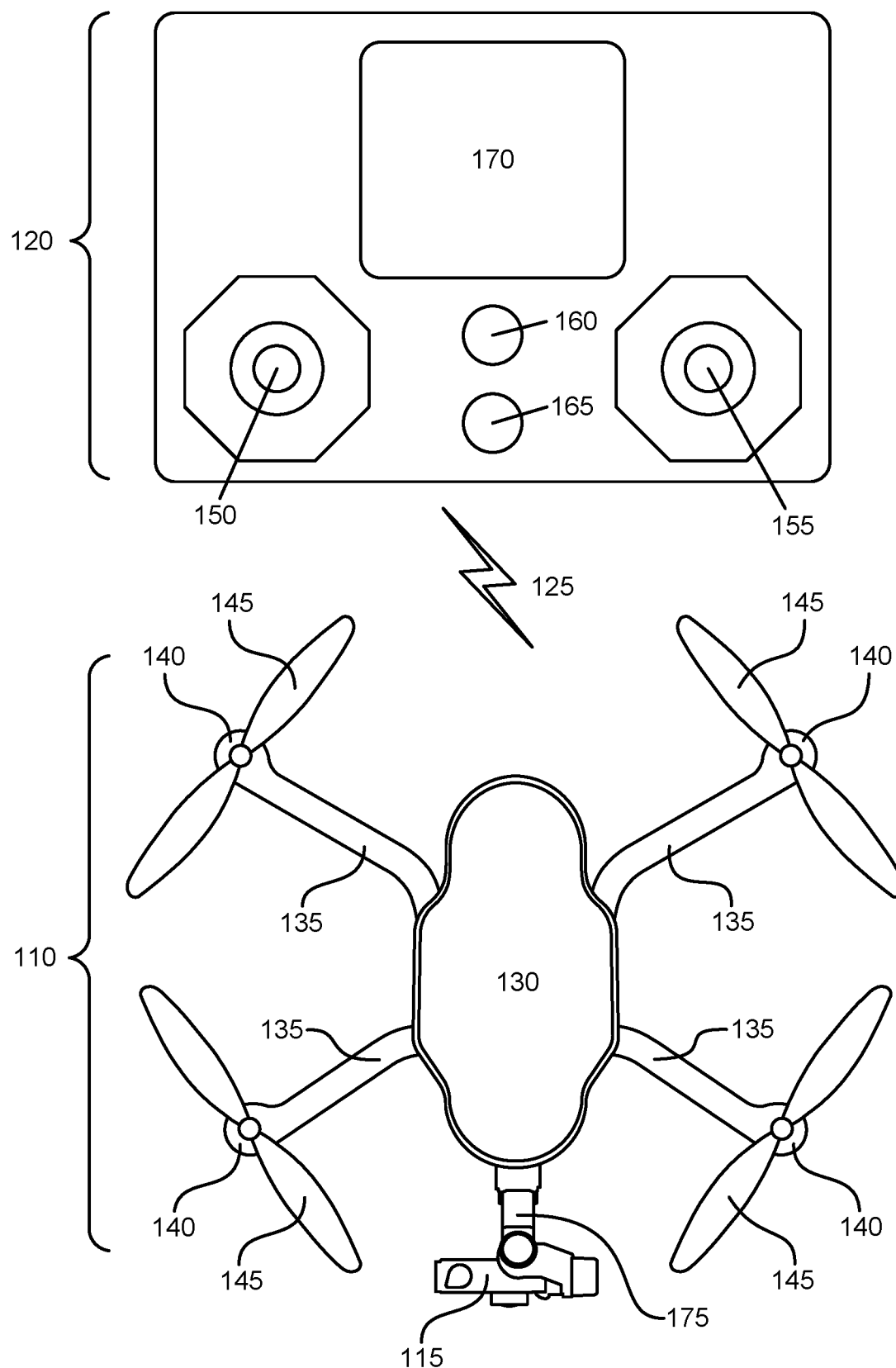
FIG. 1 is an example of a remote controlled aerial vehicle in communication with a remote controller.

Figure (FIG. 1 illustrates an example embodiment in which an aerial vehicle 110 is a quadcopter (i.e., a helicopter with four rotors). The aerial vehicle 110 in this example includes a housing 130 for payload (e.g., electronics, storage media, and/or camera), four arms 135, four rotors 140, and four propellers 145. Each arm 135 may mechanically couple with a rotor 140 to create a rotary assembly. When the rotary assembly is operational, all the propellers 145 may spin at appropriate speeds to allow the aerial vehicle 110 lift (take off), land, hover, move, and rotate in flight. Modulation of the power supplied to each of the rotors 140 may control the acceleration and torque on the aerial vehicle 110.

A gimbal 175 may be coupled to the housing 130 of the aerial vehicle 110 through a removable coupling mechanism that mates with a reciprocal mechanism on the aerial vehicle 110. The coupling between the gimbal 175 and the aerial vehicle 110 may have mechanical and communicative capabilities. In some embodiments, the gimbal 175 may be attached or removed from the aerial vehicle 110 without the use of tools. A camera 115 may be mechanically coupled to the gimbal 175, so that the gimbal 175 steadies and controls the orientation of the camera 115. It is noted that in alternate embodiments, the camera 115 and the gimbal 175 may be an integrated configuration.

The aerial vehicle 110 may communicate with a device via a wireless network 125. The device that communicates with the aerial vehicle 110 is described herein as being a remote controller 120. However, in alternate embodiments, the device may be any other computing device capable of wireless communicating (e.g., transmitting, receiving, or both) with the aerial vehicle 110. Some or all of the description attributed herein to the remote controller 120 may also be applied to other computing devices capable of wireless communication. Other computing devices may include a device with a screen that is used to display images or video captured by the aerial vehicle but not to control the aerial vehicle, such as, a laptop, smartphone, tablet, or head-mounted display.

In one embodiment, the wireless network 125 may be a long range Wi-Fi system. It also may include or be another wireless communication system, for example, one based on long term evolution (LTE), 3G, 4G, or 5G mobile communication standards. In some embodiments, the wireless network 125 consists of a single channel and the aerial vehicle 110 and the remote controller 120 implement a half-duplex system. In an alternate embodiment, the wireless network 125 includes two channels: a unidirectional channel used for communication of control information from the remote controller 120 to the aerial vehicle 110 and a separate unidirectional channel used for video downlink from the aerial vehicle 110 to the remote controller 120 (or to another device, such as a video receiver where direct video connection may be desired). Alternate wireless network configurations may also be used.

The remote controller 120 in this example includes a first control panel 150, a second control panel 155, an ignition button 160, a return button 165, and a screen (or display) 170. One primary purpose of the remote controller 120 is to facilitate movement of the aerial vehicle 110. To facilitate such movement, the remote controller 120 directs movement of a set point of the aerial vehicle 110. The set point of the aerial vehicle 110 is a mobile point in space that the aerial vehicle 110 attempts to reach through movement. The location, speed, and trajectory of the set point can be changed via instructions from a flight controller 402. When the aerial vehicle 110 reaches the set point, it hovers at that point until the location of the set point is changed via instructions from the flight controller 402. Following the change in location of the set point, the aerial vehicle 110 again moves towards the updated location of the set point. Thus movement of the set point of the aerial vehicle 110 informs movement of the aerial vehicle 110 itself. Specifically, movement of the set point of the aerial vehicle 110 designates the speed, direction, and trajectory of the aerial vehicle 110.

As previously mentioned, the set point of the aerial vehicle 110 is changed via input to the flight controller 120. The first control panel 150 of flight controller 120 may be used to control "up-down" direction (e.g. lift and landing) of the set point of the aerial vehicle 110. The second control panel 155 may be used to control "forward-reverse" or may control the direction of the set point of the aerial vehicle 110. In alternate embodiments, the control panels 150, 155 are mapped to different directions for the aerial vehicle 110. Each control panel 150, 155 may be structurally configured as a joystick controller and/or touch pad controller. The ignition button 160 may be used to start the rotary assembly (e.g., start the propellers 145). The return button 165 may be used to override the controls of the remote controller 120 and transmit instructions to the aerial vehicle 110 to autonomously return to a predefined location. The ignition button 260 and the return button 265 may be mechanical and/or solid state press sensitive buttons.

In addition, each button may be illuminated with one or more light emitting diodes (LEDs) to provide additional details. For example a LED may switch from one visual state to another to indicate with respect to the ignition button 160 whether the aerial vehicle 110 is ready to fly (e.g., lit green) or not (e.g., lit red) or whether the aerial vehicle 110 is now in an override mode on return path (e.g., lit yellow) or not (e.g., lit red). It also is noted that the remote controller 120 may include other dedicated hardware buttons and switches and those buttons and switches may be solid state buttons and switches. For example, a button or switch may be configured to allow for triggering a signal to the aerial vehicle 110 to immediately execute a landing operation.

The remote controller 120 may also include hardware buttons or other controls that control the gimbal 175 or camera 115. The remote controller 120 may allow it's user to change the preferred orientation of the camera 115. In some embodiments, the preferred orientation of the camera 115 may be set relative to the angle of the aerial vehicle 110. In another embodiment, the preferred orientation of the camera 115 may be set relative to the ground. The remote controller 120 may also transmit commands to the aerial vehicle 110 which are routed to the camera 115 through the gimbal 175 to take a picture, record a video, change a picture or video setting, and the like.

The remote controller 120 also may include a screen 170 which provides for visual display. The screen 170 may be a touch sensitive screen. The screen 170 also may be, for example, a liquid crystal display (LCD), an LED display, an organic LED (OLED) display, or a plasma screen. The screen 170 may allow for display of information related to the remote controller 120, such as menus for configuring the remote controller 120 or remotely configuring the aerial vehicle 110. The screen 170 also may display images or video captured from the camera 115 coupled with the aerial vehicle 110, wherein the images and video are transmitted to the remote controller 120 via the wireless network 125. The video content displayed on the screen 170 may be a live feed of the video or a portion of the video captured by the camera 115. It is noted that the video content may be displayed on the screen 170 within a short time (e.g., within fractions of a second) of being captured by the camera 115. The delay between the video being captured by the camera 115 and being displayed on the screen 170 may be instantaneous or nearly instantaneous in terms of human perceptual quality.

The remote controller 120 shown in FIG. 1 is a dedicated remote controller, but in alternate embodiments the remote controller may be another computing device such as a laptop, smartphone, or tablet that is configured to wirelessly communicate directly through an antenna system with the aerial vehicle 110 to control the aerial vehicle 110.

Figure 2:
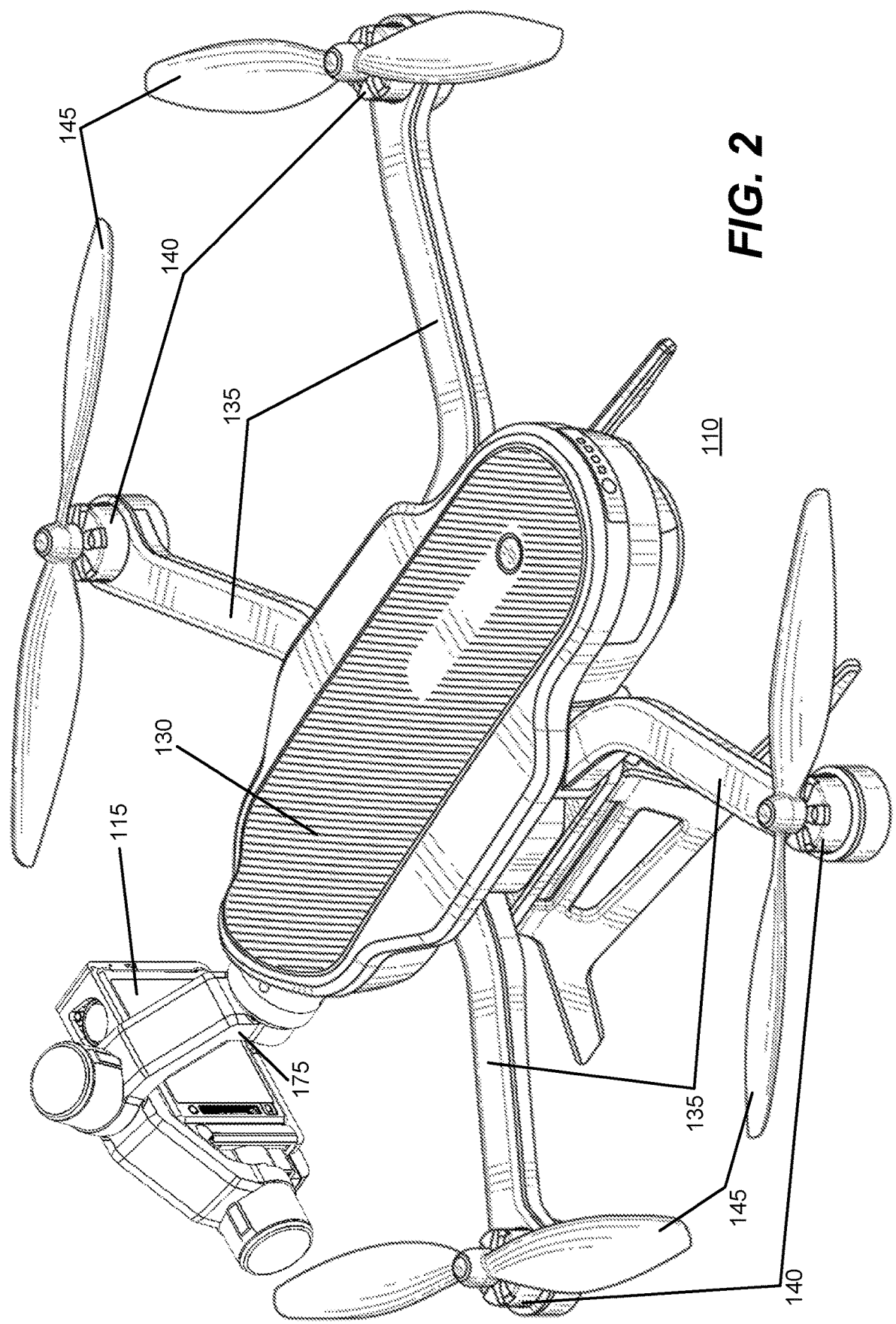
FIG. 2 illustrates an example of a remote controlled aerial vehicle.

FIG. 2 illustrates an example of an aerial vehicle 110. The aerial vehicle 110 may be coupled to a camera 115 via a gimbal 175. The camera 115 may capture video and send the video to the aerial vehicle 110 through a bus of the gimbal 175. The aerial vehicle 110 may wirelessly transmit the video to the remote controller 120. The aerial vehicle 110 may include one or more internal antennas in the housing 130 for transmitting signals to and receiving signals from the remote controller 120. The one or more antennas may be omnidirectional. In some embodiments, the antennas of the aerial vehicle 110 radiate the majority of their power beneath the aerial vehicle 110 (e.g., in the semi-sphere beneath the aerial vehicle 110).

Figure 3:
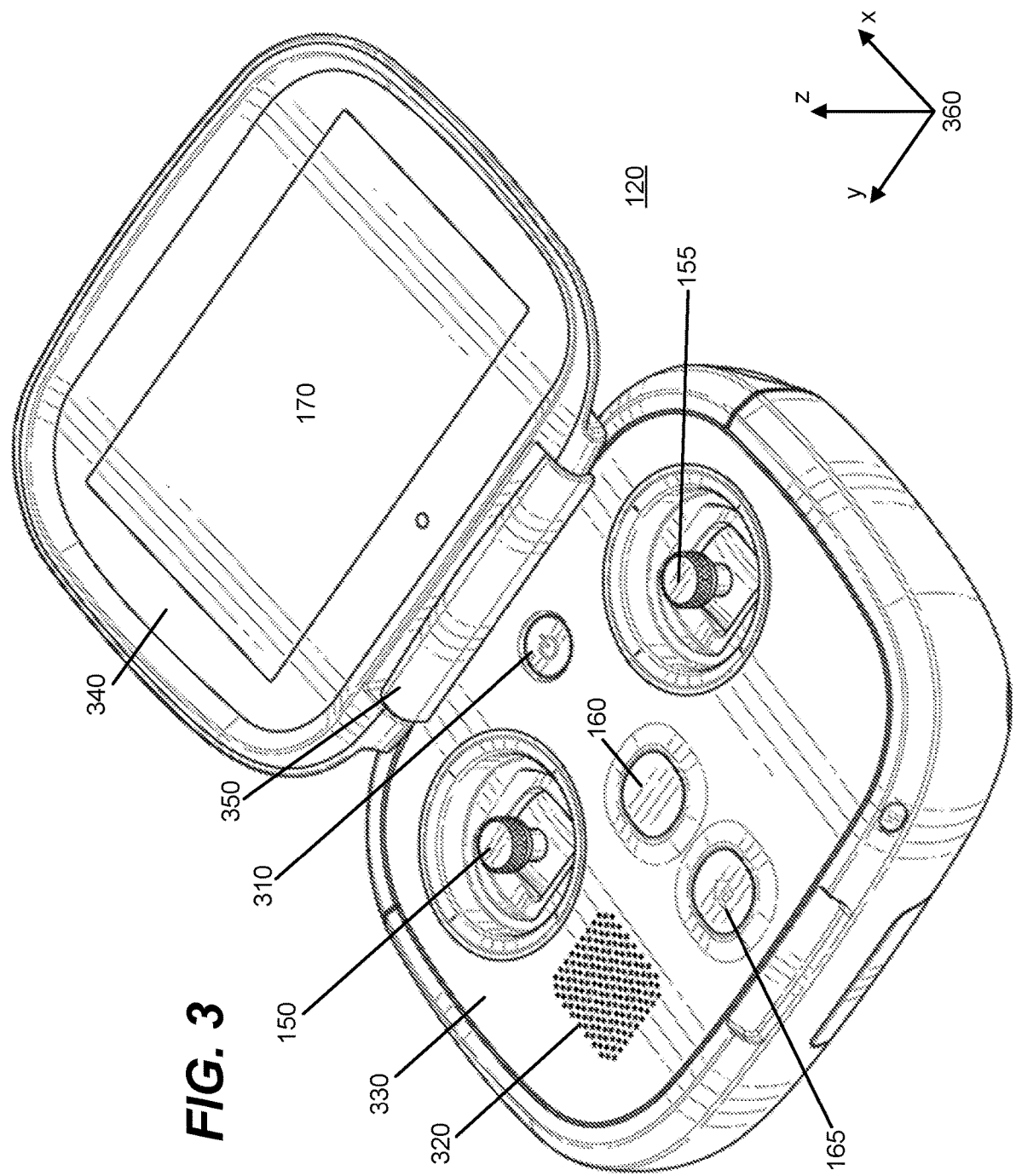
FIG. 3 illustrates an example of a remote controller.

FIG. 3 illustrates an example of a remote controller 120. The remote controller 120 may communicatively couple with the aerial vehicle 110, for example, via a wireless communication protocol such as Wi-Fi. The remote controller 120 may include a first section 330 and a second section 340 which may fold together via a hinge 350 connecting the two sections. The first section 330 may include a first control panel 150, a second control panel 155, an ignition button 160, a return button 165, a power button 310, and a speaker 320. The first section 330 also may include a housing containing electronics, such as processors and antennas. The second section 340 may include a screen 170. The hinge 350 may allow the first section 330 and second section 340 to rotate relative to each other. The hinge 350 may include one or more cams (e.g., v-cams) so that the hinge 350 may fix the rotation of the first section 340 and second section 340 to a finite number of angles. For example, the hinge 350 may be fixed at a 0° rotation (i.e., where the remote controller 120 is closed), a 90° rotation (i.e., where the screen 170 is perpendicular to the face of the first section 330), and 170° rotation (as shown in FIG. 3). In some embodiments, the hinge 350 may be an adjustable friction hinge so that the user can adjust the relative orientation of the first section 330 and the second section 340.

The remote controller 120 may include a screen 170 and a speaker 320 (e.g., an electroacoustic transducer) for providing output to a user. The speaker 320 may output sound from a video as it is displayed on the screen 170. The video may be received from the aerial vehicle 110 via the wireless network 125. The speaker 320 may also output sounds responsive to the user pressing a button or as an alert to the user. For example, the speaker may output an alert when the battery of the aerial vehicle 110 is nearly depleted, when an error is detected on the aerial vehicle 110 (e.g., a mechanical malfunction, a software error, an electronic malfunction, or a combination thereof), when the signal strength between the aerial vehicle 110 and the remote controller 120 is weak, when the antenna of the remote controller 120 is not oriented correctly, and/or when the wireless connection with the aerial vehicle 110 is lost. As another example, when one or more components of flight behavior of the aerial vehicle 110 such as trajectory or speed has been altered, the speaker 320 may output an audio alert describing the alteration in flight behavior and the screen 170 may display a visual alert providing similar information. The speaker 320 may also output an alert to indicate to the user that the aerial vehicle 110 is in close proximity to, or entering, a no-fly zone (NFZ). Furthermore, the screen 170 may display a visual warning indicating to the user that the aerial vehicle 110 is in close proximity to, or entering a NFZ.

The remote controller 120 also includes user input devices. Specifically, the remote controller 120 may include a first control panel 150, a second control panel 155, an ignition button 160, a return button 165, and a power button 310. The first control panel 150 and the second control panel, 155 may be joystick controllers for controlling the velocity and orientation of the aerial vehicle 110. The power button 310 may toggle the power of the remote controller 120 or toggle the power of the aerial vehicle 110. In some embodiments, the screen 170 may be a touch screen and thus can receive user inputs as well.

The remote controller 120 may contain one or more internal directional antennas (not shown in FIG. 3). For example, the remote controller 120 may include two ceramic patch antennas. In some embodiments, the controller 120 uses both antennas for transmission and reception. In alternate embodiments, one antenna is used for reception and the other for transmission. The remote controller 120 may also include a Yagi-Uda antenna, a log-periodic antenna, a parabolic antenna, a short backfire antenna, a loop antenna, a helical antenna, a phased array of antennas, any other direction antenna, or some combination thereof.

Figure 4A:
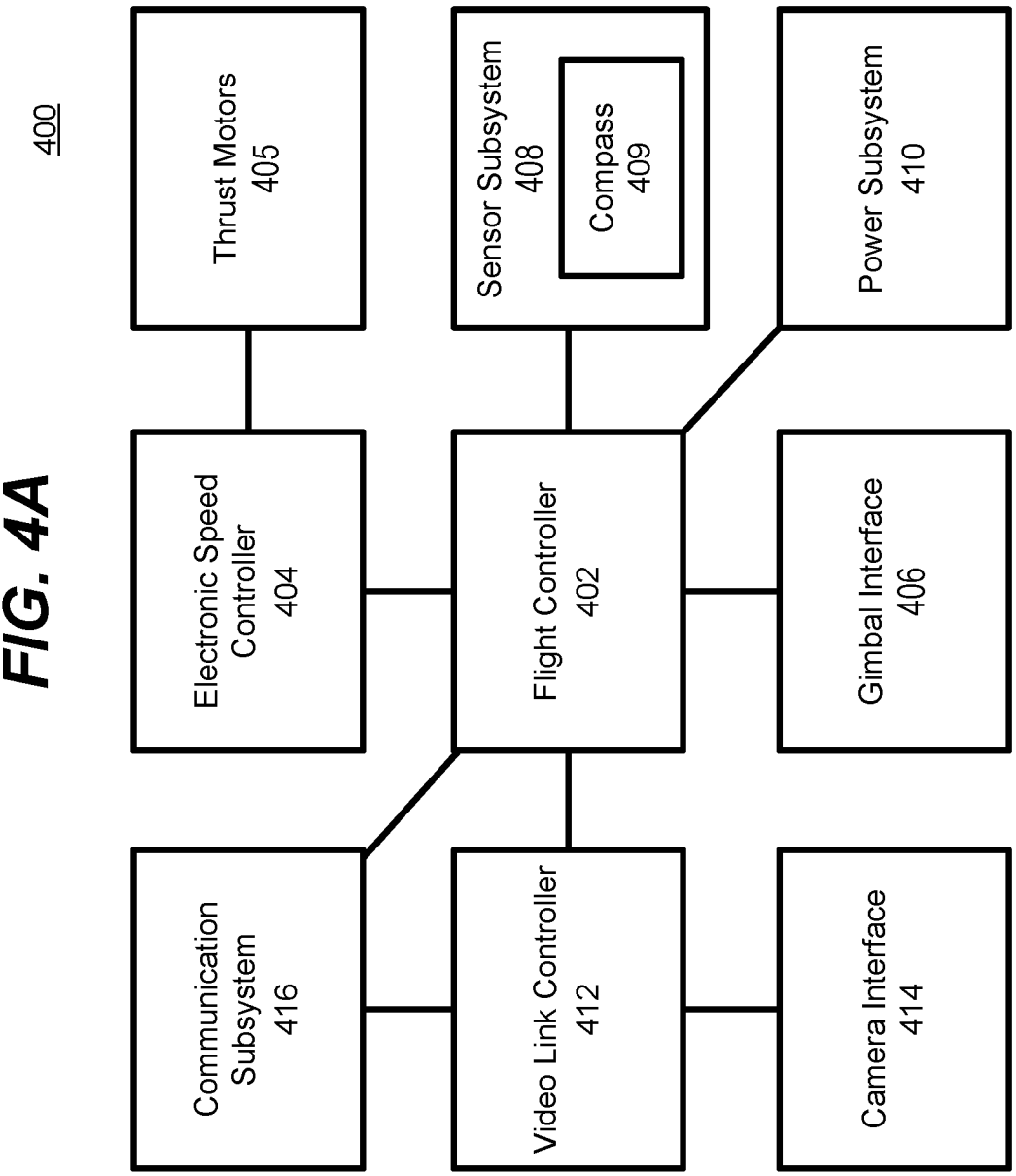
FIG. 4A illustrates an example of a remote controlled aerial vehicle electronics and control systems.

FIG. 4A illustrates an example embodiment of an electronics and control (EC) system 400 of the aerial vehicle 110. The EC system 400 may include the flight controller 402, an electronic speed controller 404, one or more thrust motors 405, a gimbal interface 406, a sensor (or telemetric) subsystem 408, a power subsystem 410, a video link controller 412, a camera interface 414, and a communication subsystem 416. The components may communicate directly or indirectly with each other through a data bus on the aerial vehicle 110.

In one embodiment, the communication subsystem 416 may be a long-range Wi-Fi system. As noted above, the communication subsystem 416 may include or be another wireless communication system, for example, one based on long term evolution (LTE), 3G, 4G, and/or 5G mobile communication standards. The communication subsystem 416 also may be configured with a unidirectional RC channel for communication of controls from the remote controller 120 to the aerial vehicle 110 and a separate unidirectional channel for video downlink from the aerial vehicle 110 to the remote controller 120 (or to a video receiver where direct video connection may be desired). The sensor subsystem 408 may include navigational components, for example, a gyroscope, accelerometer, a global positioning system (GPS) and/or a barometric sensor. The telemetric compass may also include an unmanned aerial vehicle (UAV) compass 409. The UAV compass 409 may include one or more magnetometer sensors with which it determines the orientation of the aerial vehicle 110. The power subsystem 410 may include a battery pack and/or a protection circuit module as well as a power control and/or battery management system. The camera interface 414 may interface with an image capture device or may include an integrated image capture device.

The flight controller 402 of the EC system 400 may communicate with the remote controller 120 through the communication subsystem 416. The flight controller 402 may control the flight related operations of the aerial vehicle 110 by controlling the other components such as the electronic speed controller 404 and/or the sensor subsystem 408. The flight controller 402 may control a gimbal 175 through the gimbal interface 406. The flight controller 402 also may interface with the video link controller 412 for operation control of an image capture device (e.g., camera 115) coupled to the aerial vehicle 110. The flight controller 402 can configure the flight path, the speed, the trajectory, and the position of the aerial vehicle 110 based on input from the user (for instance, via the remote controller 120). In addition, as described below in greater detail, the flight controller 402 can configure the flight path, speed, trajectory, and position of the aerial vehicle 120 without receiving input from the user, for instance when the aerial vehicle 120 is adjacent to, within a threshold proximity of, or flying towards a virtual wall or NFZ.

The electronic speed controller 404 may be configured to interface with the thrust motors 405 (via an electronics interface) to control the speed and thrust applied to the propellers 140 of the aerial vehicle 110. The video link controller 412 may be configured to communicate with the camera interface 414 to capture and transmit images from an image capture device to the remote controller 120 (or other device with a screen such as a smart phone, e.g., via the communication subsystem 416. The power subsystem 410 may be configured to manage and supply power each of the components of the EC system 400.

Figure 4B:
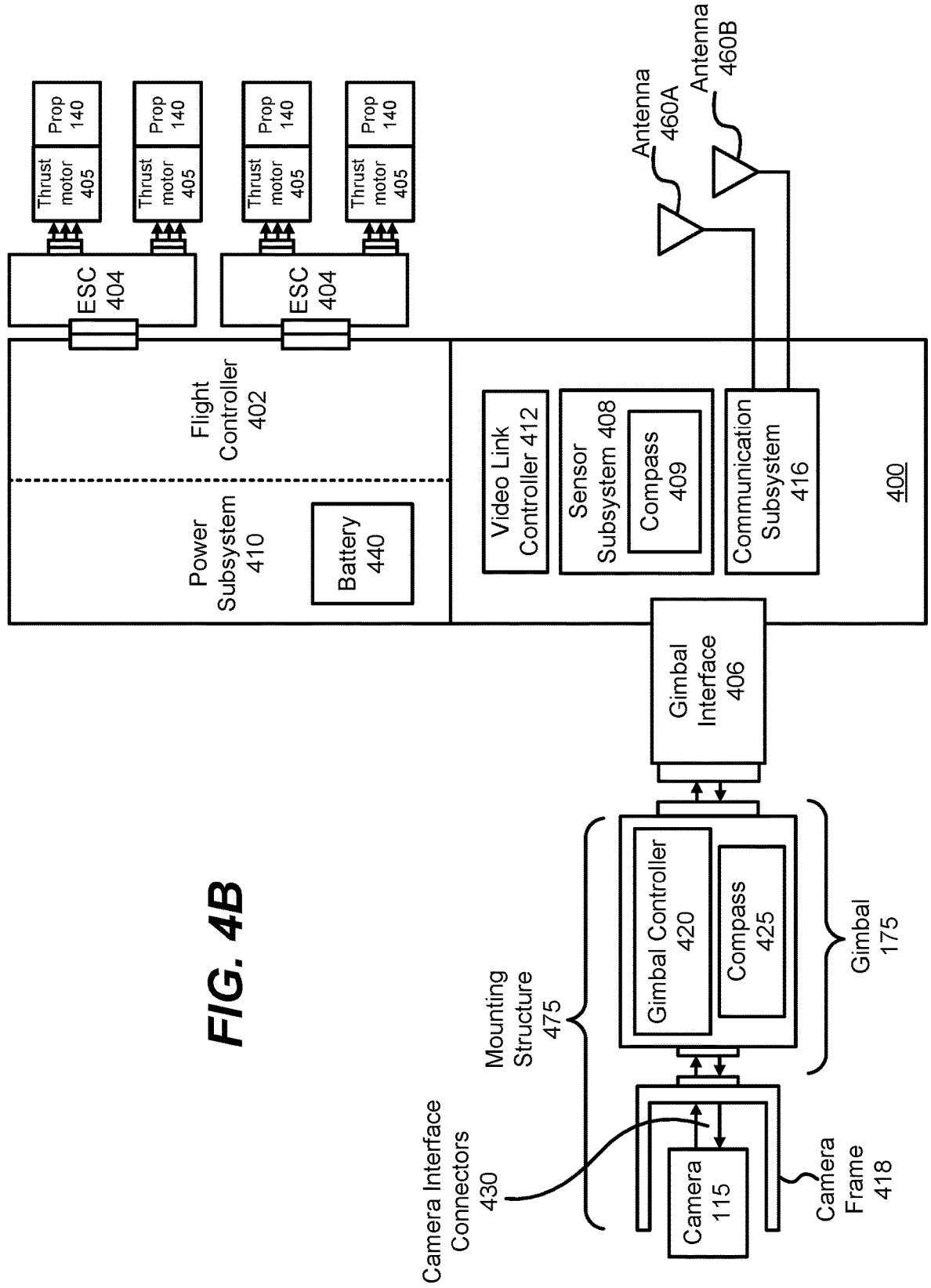
FIG. 4B illustrates an example interconnect architecture of a remote controlled aerial vehicle with a gimbal.

FIG. 4B illustrates an example interconnect architecture of the aerial vehicle 110 with the gimbal 175. Also shown is a battery 440 as a part of the power subsystem 410 and two antennas 460A-460B as a part of the communication subsystem 416. This figure illustrates in an example embodiment that the flight controller 402 may be coupled with two electronic speed controllers 404. Each electronic speed controller 404 in this configuration may drive two thrust motors 405 (via respective components of each thrust motor).

Also shown is a gimbal interface 406 that may communicatively couple the gimbal controller 420 to components of the EC system 400. In particular, the gimbal interface 406 may be communicatively coupled with the video link controller 412, the sensor subsystem 408 (e.g., the GPS and/or the compass), and/or one or more of the antennas 460A-460B. The gimbal interface 406 may be used to feed data (e.g., telemetric data, control signals received from the remote controller 120, and/or video link control signals) from the video link controller 412, the sensor subsystem 408, and/or one or more of the antennas 460A-460B to the gimbal controller 420. The gimbal controller 420 may be communicatively coupled with the camera 115 through one or more camera interface connectors 430. The camera interface connectors 430 may include camera communication interfaces such as universal serial bus (USB) and/or HDMI. The media captured by the camera 115 (e.g., still images, video, and/or audio) may be communicated to the aerial vehicle 110 through the camera interface connectors 430. Data (e.g., telemetric data from the sensor subsystem 408) also may be sent via the camera interface connectors 430 to the camera 115 to associate with video captured and stored on the camera 115.

Virtual Walls and No-Fly Zone Navigation

Figure 5:
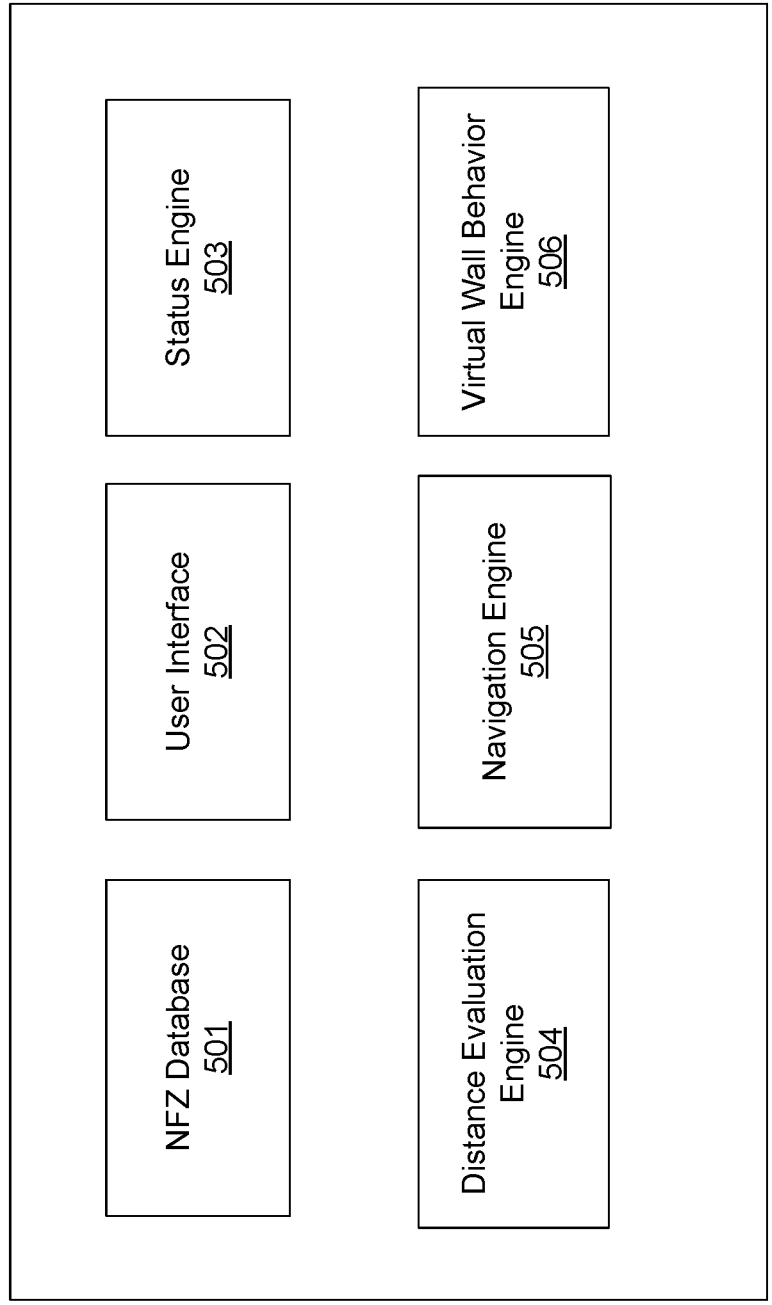
FIG. 5 is a high-level block diagram illustrating a flight controller, in accordance with one embodiment.

FIG. 5 is a high-level block diagram of the flight controller 402 in accordance with one embodiment. Some embodiments of the flight controller 402 have different components than those described here. The embodiment of the flight controller 402 illustrated in FIG. 5 includes a NFZ database 501, a user interface 502, a status engine 503, a distance evaluation engine 504, a navigation engine 505, and a virtual wall behavior engine 506.

The NFZ database 501 stores information describing NFZ boundaries, such as a geographic coordinates, locations, and the like. In some embodiments, the NFZ database 501 stores information describing all NFZs in a specified geographic area. For example, the NFZ database 501 may store coordinates describing NFZs within a specified radius of the aerial vehicle 110. Likewise, the NFZ database 501 may be updated in real time (e.g., from a server communicatively coupled to the flight controller 402) to include additional or different NFZs, for instance as the aerial vehicle 110 moves to a new location, as time passes, or as environmental conditions change. For example, the NFZ information of the NFZ database 501 may be updated as the aerial vehicle 110 travels across county border lines. As another example, the NFZ database 501 may be updated to exclude an airport's NFZ information after the last planes have entered and exited the airport on night. As a further example, the NFZ database 501 may be updated to exclude specific types of NFZs, for instance as specified by a user via the user interface 502. NFZs may be registered with a governing entity (e.g., private property or high-security NFZs may be registered with local or federal governments), or may be established by rules governing UAV flight (e.g., "stay 1000 meters away from airport boundaries). In some embodiments, the NFZ database 501 can receive NFZ information from a governing entity with which NFZs are registered.

The NFZ database 501 can store many types of NFZ information. For instance, NFZs can be defined by specific geographic coordinates, by data describing dimensions of an NFZ (e.g., a radius of 50 m from a particular location), or by underlying geographic features or property lines (e.g., "The White House" or "Mount Rushmore"). In some embodiments, NFZs can vary depending on time, the day, or the season of the year. In some embodiments, NFZ data is broken down into data describing the individual virtual walls of each NFZ. Additional embodiments of NFZs not explicitly mentioned here are also possible. Furthermore, any combination of NFZ embodiments is possible.

The user interface 502 receives user input from the remote controller 102 requesting movement of the set point of the aerial vehicle 110. The user input from remote controller 120 may request a change in the speed, direction, trajectory, or location of the set point of the aerial vehicle 110. Such requests received by the user interface 502 are routed to the navigation engine 505 for implementation. The navigation engine 505 is discussed in greater detail below. By changing the parameters of the set point of the aerial vehicle 110, the speed, direction, trajectory, and location of the aerial vehicle 110 subsequently change as the aerial vehicle adjusts its movement in an attempt to reach the set point.

Note that while the processes and steps of NFZ navigation as described herein focus on the status and adjustment of the set point of the aerial vehicle 110, in some embodiments the same processes and steps of NFZ navigation may be based on the status and adjustment of the aerial vehicle 110 itself, rather than its set point. For example, the user interface 502 may receive user input from the remote controller 102 requesting movement of the aerial vehicle 110, rather than its set point. Similarly, the operation of additional components of the flight controller 402 may also be based on the status and adjustment of the aerial vehicle 110.

The status engine 503 identifies the state of the set point of the aerial vehicle 110 in real time. Specifically, the status engine 503 identifies the current speed, direction, trajectory, and location of the set point in real time.

The distance evaluation engine 504 determines the shortest normal distances between the set point of the aerial vehicle 110 and one or more unique virtual walls of a NFZ. Note that in this case, "unique virtual walls" refers to virtual walls including at least one different end point. The distance evaluation engine 504 determines the shortest normal distances in real time as information describing the location of the set point of the aerial vehicle 110 is received from the status engine 503. One embodiment of the general operation of the distance evaluation engine 504 is described in further detail with regard to FIG. 6.

Figure 6:
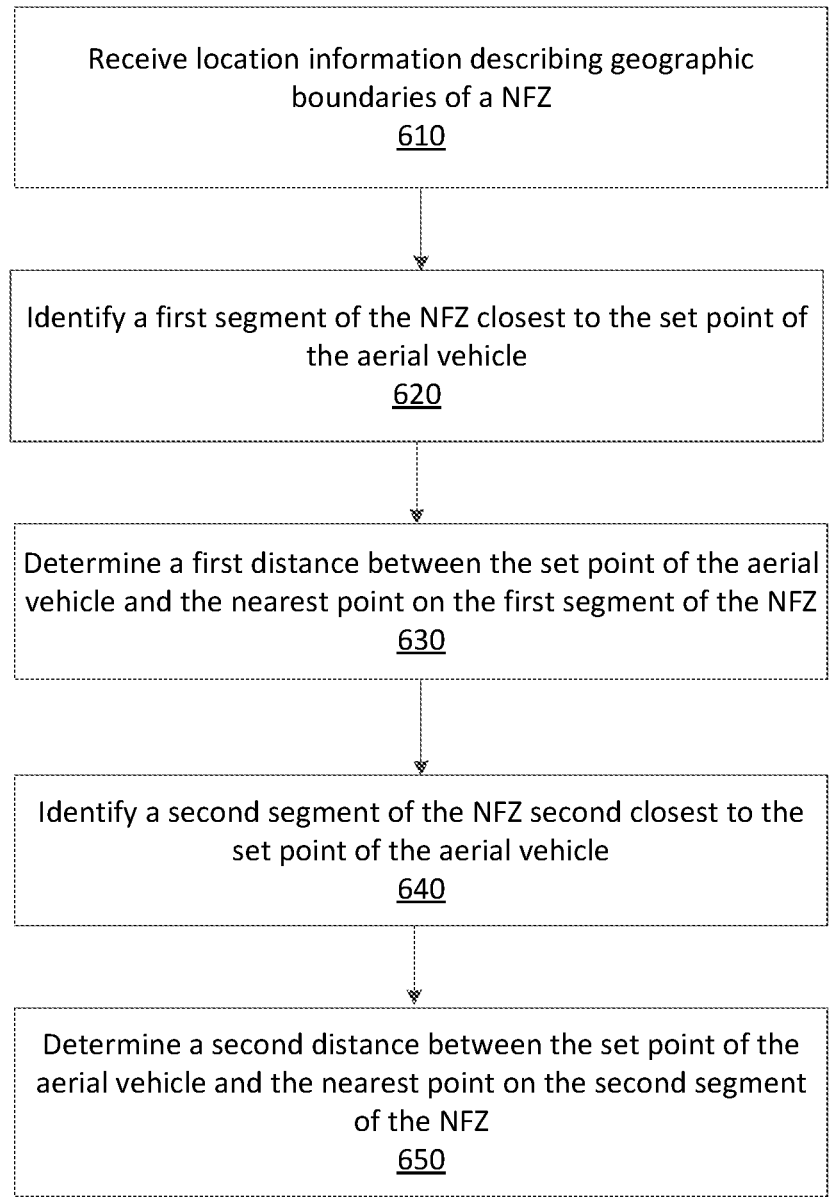
FIG. 6 is a flow chart of a process for determining distances from the set point of a remote controlled aerial vehicle to two virtual walls of a NFZ, in accordance with an embodiment.

FIG. 6 is a flow chart of a process for determining distances from the set point of the aerial vehicle 110 to the closest two virtual walls of a NFZ, in accordance with an embodiment. In alternative embodiments, the process for determining distances from the set point of the aerial vehicle 110 to two closest virtual walls can also be performed for a set of multiple NFZs comprising multiple virtual walls.

First, location information describing geographic boundaries of one or more NFZs is received 610 from the NFZ database 501. The specific NFZs for which location information is received may be selected in a plurality of ways. In one embodiment, all NFZs stored in the NFZ database 501 are selected. In another embodiment, NFZs are selected for analysis based proximity to the set point of the aerial vehicle 110. For example, only NFZs located within a threshold distance of the set point of the aerial vehicle 110 may be selected. This threshold distance may be specified within the NFZ database 501, by the distance evaluation engine 504, or by the user of the remote controller 102 via the user interface 502.

Following receipt of location information describing geographic boundaries of an NFZ 610, a first segment (i.e. a first virtual wall) of the NFZ that is closest in proximity to the set point of the aerial vehicle 110 is identified 620. Next, a first distance between the set point of the aerial vehicle 110 and the nearest point on the first segment (i.e. the first virtual wall) of the NFZ is determined 630. In other words, steps 620 and 630 determine a first shortest normal distance between an NFZ and the set point of the aerial vehicle 110.

Steps 620 and 630 are repeated for a second, unique segment (i.e. a second, unique virtual wall different from the first segment). Specifically, a second NFZ segment (i.e. a second virtual wall) that is second closest in proximity to the set point of the aerial vehicle 110 is identified 640. The second segment identified in step 640 may be an additional segment of the NFZ from which the first segment was identified in step 610, or it may be a segment from an entirely different NFZ. Then, a second distance between the set point of the aerial vehicle 110 and the nearest point on the second NFZ segment (i.e. the second virtual wall) is determined 650. In other words, steps 640 and 650 determine a shortest normal distance between a different, second closest virtual wall and the set point of the aerial vehicle 110. It should be emphasized that in some embodiments, the first distance and the second distance are determined at substantially the same time or within the same processing loop/pass.

While the embodiment of FIG. 6 describes determining two shortest normal distances between the set point of the aerial vehicle 110 and two unique virtual walls of a NFZ, in other embodiments, zero, one, three, or more shortest normal distances between the set point and NFZ virtual walls may be determined. For example, in one embodiment, the set point of the aerial vehicle 110 may be located in a region containing no NFZs (or no NFZs within a threshold distance of the set point). In another example, a NFZ may include only one virtual wall (e.g., a state border), and only one shortest normal distance is determined. In some embodiments, the set point of the aerial vehicle 110 must be within a threshold distance of a virtual wall for the virtual wall to be considered for the purpose of determining shortest normal distances. In another embodiment, shortest normal distances are only determined between the set point and virtual walls that are not obstructed from the set point by other virtual walls (a line can be drawn from the set point to the virtual wall without crossing another virtual wall). In another embodiment, the set point of the aerial vehicle 110 may be located such that it is in close proximity to two virtual walls, but positioned such that the point on the NFZ that is closest in proximity to the set point of the aerial vehicle 110 lies on a vertex connecting the two virtual walls. In such embodiments, the shortest normal distance between the set point and the two virtual walls is the same. Three embodiments of distance determination by the distance evaluation engine 504 are illustrated in FIG. 7.

Figure 7:
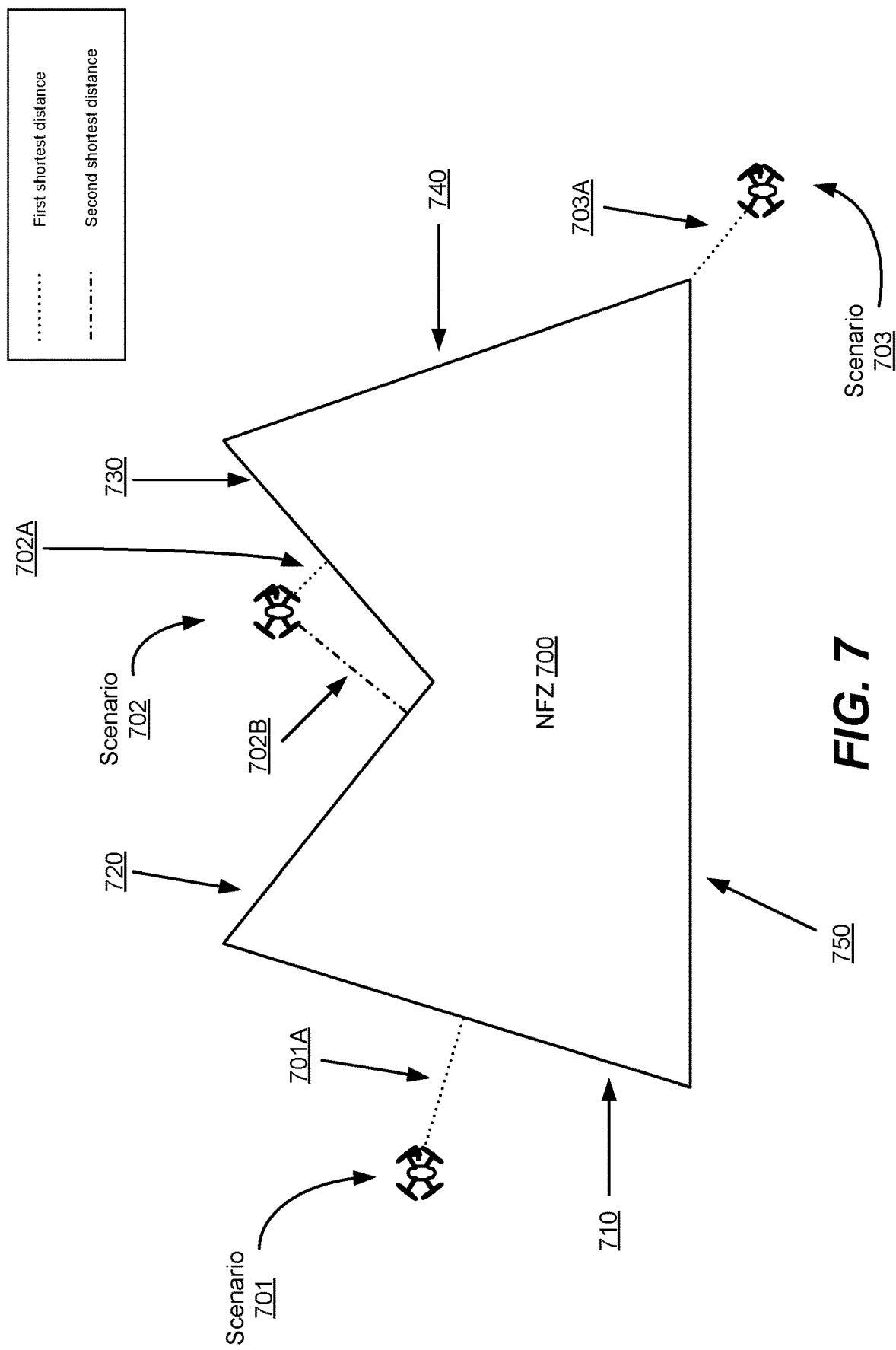
FIG. 7 illustrates three examples in which a remote controlled aerial vehicle approaches a polygonal NFZ, in accordance with one embodiment.

FIG. 7 illustrates three embodiments in which the distance evaluation engine 504 determines up to two shortest normal distances between different set points of the aerial vehicle 110 and unique virtual walls of the NFZ 700. The NFZ 700 comprises five unique virtual walls: a virtual wall 710, a virtual wall 720, a virtual wall 730, a virtual wall 740, and a virtual wall 750. Note that for illustrative simplicity, FIG. 7 assumes that the set point of the aerial vehicle 110 and the aerial vehicle 110 are co-located.

Lines solely comprising dots that connect the aerial vehicle 110 to a first virtual wall of the NFZ 700 indicate a first shortest normal distance between the aerial vehicle 110 and the NFZ 700. Lines comprising alternating dots and dashes that connect the aerial vehicle 110 to a second, unique virtual wall of the NFZ 700 indicate a shortest normal distance between the aerial vehicle 110 and a different, second closest virtual wall of the NFZ 700.

In a scenario 701, the set point of the aerial vehicle 110 is positioned outside a convex portion of polygonal the NFZ 700 nearest to the virtual wall 710. Thus the distance evaluation engine 504 only determines a single closest normal distance 701A between the set point of the aerial vehicle 110 and the virtual wall 710 of the NFZ 700.

A scenario 702 depicts the aerial vehicle 110 as located within a concave corner of the polygonal the NFZ 700 between the virtual wall 720 and the virtual wall 730. Two shortest normal distances from the set point of the aerial vehicle 110 to the unique virtual walls of the NFZ 700 are determined by the distance evaluation engine 504. Note that the closest the virtual wall 730 and the second closest the virtual wall 720 of the NFZ 700 are unique walls. Specifically, the closest the virtual wall 730 and the second closest the virtual wall 720 of the NFZ 700 share at least one different endpoint. The shortest normal distance from the set point of the aerial vehicle 110 to the virtual wall 730 is denoted by 702A. The second shortest normal distance from the set point of the aerial vehicle 110 to the virtual wall 720 is denoted by 702B.

A scenario 703 depicts the aerial vehicle 110 as positioned outside a convex portion of polygonal the NFZ 700. The aerial vehicle 110 is positioned such that the nearest point on the two closest virtual walls 740 and 750 is the same point. Specifically, the nearest point on both of the two virtual walls 740 and 750 is the vertex connecting the two virtual walls 740 and 750. As a single closest distance applies to both virtual walls, only one distance 703A is determined by the distance evaluation engine 504.

Turning back to FIG. 5, the navigation engine 505 instructs the movement of the set point of the aerial vehicle 110 based on user input received via the user interface 502 and instructions received from the virtual wall behavior engine 506. The virtual wall behavior engine 506 is described below in further detail. Specifically, the navigation engine 505 may change the speed, direction, trajectory, or location of the set point of the aerial vehicle 110. By changing the parameters of the set point of the aerial vehicle 110, the speed, direction, trajectory, and location of the aerial vehicle 110 subsequently change. Note that there may be lag time between instruction of the set point movement by the navigation engine 505 and adherence of the aerial vehicle 110 to the instruction.

Commands received by the navigation engine 505 from the virtual wall behavior engine 506 override user input received via the user interface 502. In other words, when faced with conflicting commands from the user interface 502 and the virtual wall behavior engine 506, the navigation engine 505 moves the set point of the aerial vehicle 110 according to the instructions of the virtual wall behavior engine 505. When instructions are not received from the virtual wall behavior engine 506, or when instructions received from the user interface 502 comply with the restrictions received from the virtual wall behavior engine 506, the navigation engine 505 moves the set point of the aerial vehicle 110 according to commands from the user interface 502.

The virtual wall behavior engine 506 establishes restrictions on the movement of the set point of the aerial vehicle 110 based on information from the status engine 503 and the distance evaluation engine 504 to ensure that the aerial vehicle 110 does not fly into NFZs. Specifically, the virtual wall behavior engine 506 sends restrictions on the speed, direction, and trajectory of the set point of the aerial vehicle 110 to the navigation engine 505 in real time. By restricting the parameters of the set point of the aerial vehicle 110, the speed, direction, trajectory, and location of the aerial vehicle 110 are subsequently restricted. One embodiment of the general operation of the virtual wall behavior engine 506 is described in further detail with regard to FIG. 8.

Figure 8:
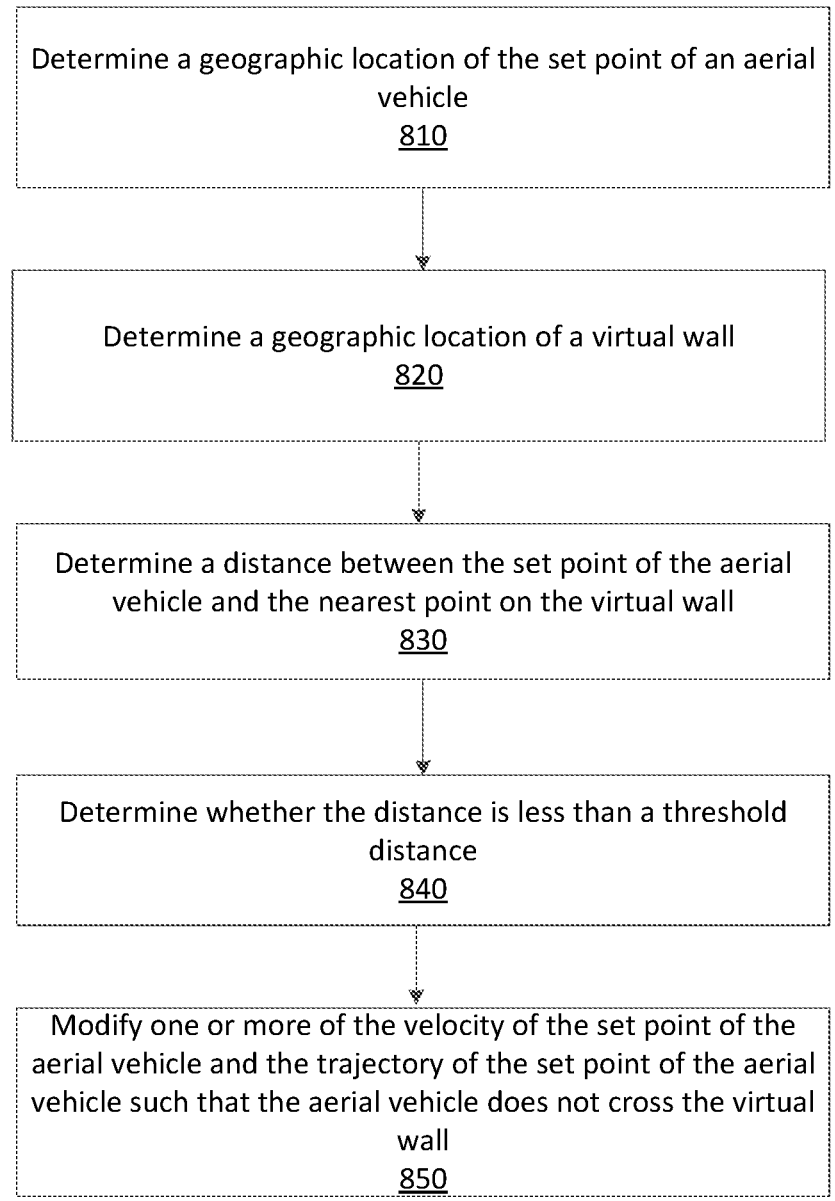
FIG. 8 is a flow chart of a process for modifying the movement of the set point of a remote controlled aerial vehicle, in accordance with an embodiment.

FIG. 8 a flow chart of a process for modifying the movement of the set point of the aerial vehicle 110, in accordance with an embodiment. In the embodiment of FIG. 8, a geographic location of the set point of the aerial vehicle 110 is determined 810 using input from the status engine 503. Next, the NFZ database 501 is queried to determine 820 a geographic location of a virtual wall. The specific virtual wall chosen for analysis in step 820 may be selected in a plurality of ways. For instance, the virtual wall may be chosen based on its inclusion in a specific NFZ, based on proximity of the virtual wall to the aerial vehicle 110 or the set point (e.g., the closest virtual wall to the set point), based on user input, or based on any other suitable criteria.

After the geographic location of the virtual wall is determined 820, the distance evaluation engine 504 determines 830 a distance between the set point of the aerial vehicle 110 and the nearest point on the virtual wall (the "shortest normal distance"). Next, the distance evaluation engine 504 determines 840 whether the shortest normal distance is less than a threshold distance. This threshold distance may be specified within the NFZ database 501, by the virtual wall behavior engine 506, or by the user of the remote controller 102 via the user interface 502. In some embodiments, the threshold distance is referred to as a "deceleration zone" of the working virtual wall.

Finally, dependent upon the location of the set point of the aerial vehicle 110 relative to the deceleration zone, the virtual wall behavior engine 506 modifies 850 one or more of the velocity of the set point of the aerial vehicle 110 and the trajectory of the set point of the aerial vehicle 110 such that the aerial vehicle 110 does not cross the virtual wall. This modification is then relayed to the navigation engine 505 as described previously. Several embodiments of step 850 are discussed with regard to FIGS. 9A, 9B, and 9C.

FIG. 8 describes one embodiment of the general operation of the virtual wall behavior engine 506. However, additional nuanced embodiments of the operation of the virtual wall behavior engine 506 are available depending on the mode of operation under which the virtual wall behavior engine 506 operates. Three example modes of operation available to the virtual wall behavior engine 506 include: a free-sliding mode of operation, a restricted-sliding mode of operation, and a no-sliding mode of operation. Each mode of operation provides a different set of behavior nuances to the operation of the virtual wall behavior engine 506. These modes of operation are meant to enable smoother navigation of the aerial vehicle 110 around virtual walls of an NFZ. The three modes of operation listed above are described in further detail with regard to FIGS. 9A, 9B, and 9C respectively.

The mode of operation of the virtual wall behavior engine 506 may be selected by the programmer of controller 402 (e.g., a default mode of operation setting), by user input to the user interface 502, or by any other suitable means. In one embodiment, the working mode of operation of the virtual wall behavior engine 506 is fixed. In an alternative embodiment, the working mode of operation of the virtual wall behavior engine 506 may be configured in real time. In various embodiments, each NFZ stored in the NFZ database 501 may be associated with a specific mode of operation of the virtual wall behavior engine 506. For example, when the set point of the aerial vehicle 110 comes within a specified distance of an NFZ associated with the restricted-sliding mode of operation, the virtual wall behavior engine 506 may automatically be configured to operate in the restricted-sliding mode of operation. In further embodiments, the working mode of operation of the virtual wall behavior engine 506 may be configured based on the location of the set point of the aerial vehicle 110 relative to a NFZ. For example, when the set point of the aerial vehicle 110 is determined to be located within a concave corner of a NFZ, the virtual wall behavior engine 506 may automatically be configured to operate in the restricted-sliding mode of operation. Additional embodiments not explicitly mentioned here are also possible. Furthermore, any combination of these embodiments is possible.

Each mode of operation defines a unique set of behavioral parameters applied by the aerial vehicle 110 as the aerial vehicle encounters an NFZ when operating in that mode of operation. These NFZ parameters are used by the virtual wall behavior engine 506 in instructing the movement of the set point of the aerial vehicle 110 under the mode of operation. Thus prior to describing each mode of operation, the set of NFZ parameters corresponding to the mode of operation will be described.

Figure 9A:
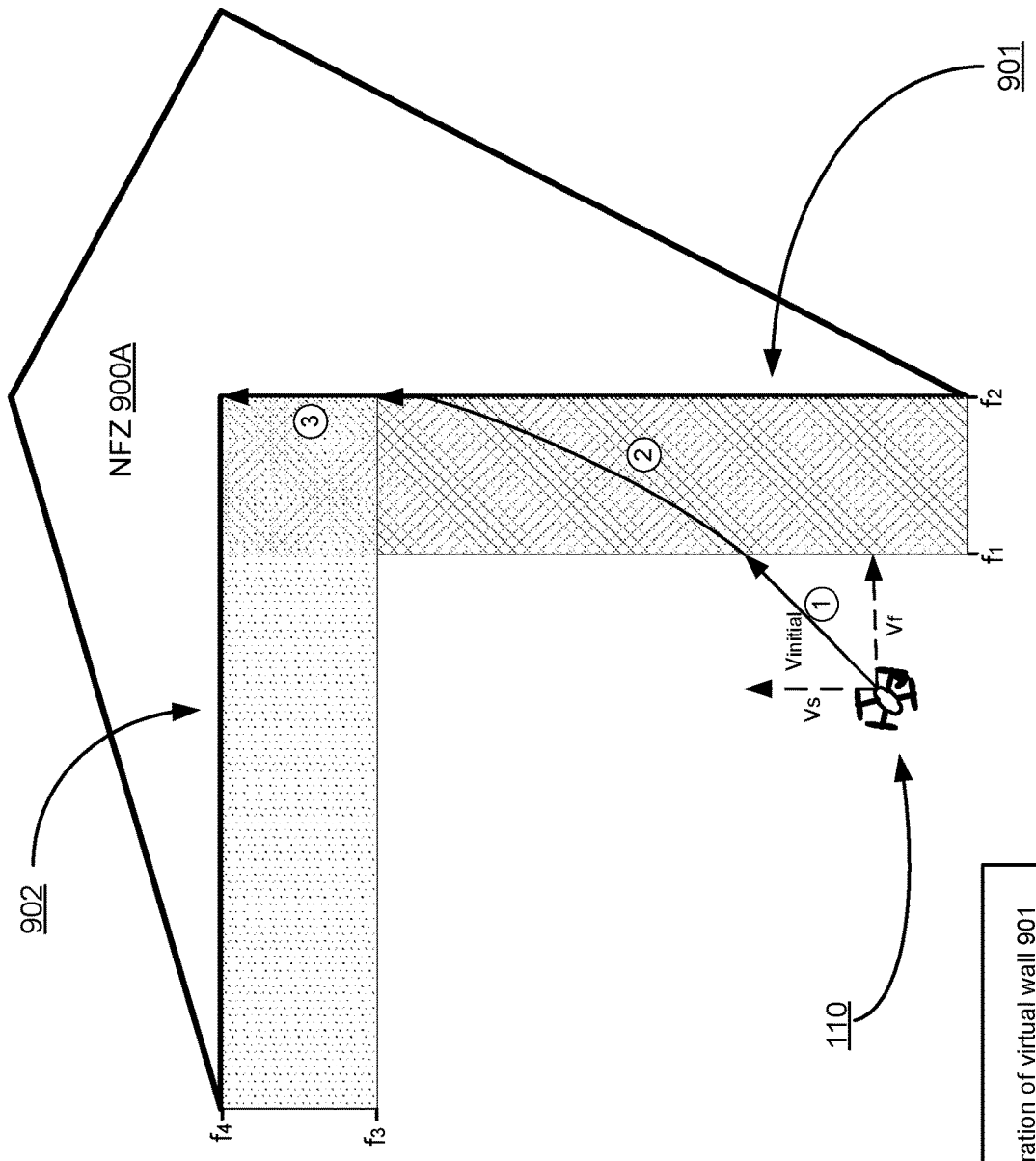
FIG. 9A illustrates a free-sliding mode of operation used by a remote controlled aerial vehicle to navigate the area surrounding a NFZ, in accordance with one embodiment.

FIG. 9A illustrates the aerial vehicle 110 navigating the area surrounding a NFZ 900A when operating in the free-sliding mode of operation. Note that the free-sliding mode of operation described herein may apply to the operation of the aerial vehicle 110 in any alternative environment containing any alternative NFZ. For example, the aerial vehicle 110 may be located outside of a convex corner of an NFZ rather than within a concave corner as shown in FIG. 9A.

Under the free-sliding mode of operation, each virtual wall of each NFZ has a corresponding zone of deceleration. A zone of deceleration is a boundary area that extends a specified distance from a virtual wall of a NFZ in the direction opposite the interior of the NFZ. The width of extension of the zone of deceleration is uniform along the entire length of a virtual wall. Two examples of zones of deceleration can be seen in FIG. 9A. The zone of deceleration of a virtual wall 901 is indicated by the cross-hatched area. The zone of deceleration of a virtual wall 902 is indicated by the dotted area. Note that two or more zones of deceleration may overlay one another as shown in FIG. 9A.

Each point along the width of a zone of deceleration is associated with a velocity scaling factor. Velocity scaling factors are used to constrain the velocity of the set point of the aerial vehicle 110 as it approaches a virtual wall under the free-sliding mode of operation. As shown in FIG. 9A, $f_1$ is the velocity scaling factor associated with the point along the width of the zone of deceleration of the virtual wall 901 that is furthest from the virtual wall 901. $f_2$ is the velocity scaling factor associated with the point along the width of the zone of deceleration of the virtual wall 901 that is co-located on the virtual wall 901. Each point along the width of the zone of deceleration of the virtual wall 901 that is between the outermost point of the zone of deceleration of the virtual wall 901 and the innermost point of the zone of deceleration of the virtual wall 901 is also associated with a velocity scaling factor. Thus the width of the zone of deceleration of the virtual wall 901 is associated with an array of velocity scaling factors. A similar pattern applies to the zone of deceleration of the virtual wall 902.

An array of velocity scaling factors corresponding to a zone of deceleration may follow a specified distribution. For example, in FIG. 9 the velocity scaling factors within the array corresponding to the zone of deceleration of the virtual wall 901 decrease linearly from $f_1$ to $f_2$, where $f_1$ is equal to 1 and $f_2$ is equal to 0. The same linear decreasing distribution applies to the array of velocity scaling factors $f_3$ to $f_4$ that corresponds to the zone of deceleration of the virtual wall 902. Note that while the zones of deceleration depicted in FIG. 9A are associated with a linear array of velocity scaling factors with endpoints $f_1$ and $f_2$ equal to 1 and 0 respectively, a zone of deceleration may be described by any set of scaling factors, any scaling distribution, and any endpoints of the zone of deceleration.

The starting position of the set point of the aerial vehicle 110 is indicated by the UAV icon in FIG. 9A. From its starting position, the set point of the aerial vehicle 110 travels at a velocity $v_{initial}$ along the trajectory indicated by the corresponding arrow. For the example shown in FIG. 9A, it is assumed that $v_{initial}$ is the maximum overall possible speed of the aerial vehicle 110. The components of the velocity $v_{initial}$ that are perpendicular and parallel to the virtual wall 901 are of and $v_s$ respectively. Specifically, of is the component of the initial velocity of the set point of the aerial vehicle 110 that is perpendicular to the nearest virtual wall of the NFZ 900A. This nearest virtual wall is the virtual wall 901 in FIG. 9A. $V_s$ is the component of the initial velocity of the set point of the aerial vehicle 110 that is perpendicular to the second nearest virtual wall of the NFZ 900A. This second nearest virtual wall is the virtual wall 902 in FIG. 9A.

When the set point of the aerial vehicle 110 enters the zone of deceleration of the virtual wall 901 as depicted in step 2 of FIG. 9A, the velocity of the set point of the aerial vehicle 110 is partially restricted based on the set point's distance from the virtual wall 901. Specifically, the component of the velocity that is parallel to the virtual wall 901 remains the same, but the component of the velocity perpendicular to the virtual wall 901 adheres to a maximum velocity that is determined by multiplying the maximum possible velocity of the aerial vehicle 110 by the velocity scaling factor associated with the point along the width of the zone of deceleration at which the set point is located. Because the array of velocity scaling factors of the zone of deceleration of the virtual wall 901 linearly decreases from 1 to 0 from the outer edge of the zone of deceleration to the inner edge of the zone of deceleration, the component of the velocity perpendicular to the virtual wall 901 decreases linearly as the set point approaches the virtual wall 901. For example, if the overall maximum velocity of the aerial vehicle 110 is 15 m/s and the set point of the aerial vehicle 110 is located at the midpoint of the width of the zone of deceleration where the velocity scaling factor is equal to 0.5, the component of the velocity perpendicular to the virtual wall 901 is restricted to 7.5 m/s. Because the component of the velocity perpendicular to the virtual wall 901 is linearly restricted according to its location but the component of the velocity parallel to the virtual wall 901 stays the same, the trajectory of the set point of the aerial vehicle 110 is asymptotic as it approaches the virtual wall 901.

Finally, when the set point of the aerial vehicle 110 reaches the edge of the zone of deceleration that is co-located with the virtual wall 901, the velocity scaling factor $f_2$ is equal to 0 and thus the component of the velocity perpendicular to the virtual wall 901 also becomes zero. As a result, the aerial vehicle 110 simply travels parallel to the virtual wall 901 towards the virtual wall 902 at velocity $v_s$.

Note that the component of the velocity of the set point of the aerial vehicle 110 that is perpendicular to the virtual wall in question cannot exceed the maximum velocity determined by the relevant velocity scaling factor. However the velocity of the set point of the aerial vehicle 110 that is perpendicular to the virtual wall in question can be less than the maximum velocity. For example, if the set point of the aerial vehicle 110 moves at a constant velocity of 7.5 m/s in a direction perpendicular to the virtual wall 901 under the conditions outlined above, its velocity will not change until it passes the midpoint of the zone of deceleration of the virtual wall 901 where the velocity is restricted to a maximum of 7.5 m/s. In some embodiments, when the set point of the aerial vehicle moves at a rate slower than the restricted maximum rate of 7.5 m/s, the velocity of the set point will not change until the set passes some threshold distance after the midpoint of the zone of deceleration corresponding to the velocity of the set point.

Turning back to FIG. 9A, as shown in step 3, when the set point of the aerial vehicle 110 enters the zone of deceleration of the virtual wall 902, the velocity of the set point of the aerial vehicle 110 is further restricted, this time based on the set point's distance from the virtual wall 902. As in the case in which the set point of the aerial vehicle 110 approached the virtual wall 901, the component of the velocity of the set point of the aerial vehicle 110 that is parallel to the virtual wall 902 remains the same, but the component of the velocity of the set point of the aerial vehicle 110 that is perpendicular to the virtual wall 902 adheres to a maximum velocity calculated by multiplying the maximum possible velocity of the aerial vehicle 110 by the velocity scaling factor associated with the point along the width of the zone of deceleration at which the set point of the aerial vehicle 110 is located. Recall from the description of step 2 that the component of the velocity of the set point of the aerial vehicle 110 that is parallel to the virtual wall 902 is equal to 0 and the component of the velocity of the set point of the aerial vehicle 110 that is perpendicular to the virtual wall 902 is $v_s$.

As described previously, the array of velocity scaling factors corresponding the width of the zone of deceleration of the virtual wall 902 is similar to that of the zone of deceleration of the virtual wall 901. Specifically, the velocity scaling factor $f_3$ is equal to 1, the velocity scaling factor $f_4$ is equal to 0, and a linear, decreasing distribution of velocity scaling factors exists in between $f_3$ and $f_4$. Thus as the set point of the aerial vehicle 110 approaches the virtual wall 902, the component of the velocity parallel to the virtual wall 902 remains the same at a value of zero, but the component of the velocity of the set point of the aerial vehicle 110 that is perpendicular to the virtual wall 902 decreases linearly until it becomes zero when the set point reaches the edge of the zone of deceleration of the virtual wall 902. Then the aerial vehicle 110 hovers with an overall velocity equal to zero at the vertex between virtual walls 901 and 902 until the location of the set point is changed.

In order to leave the corner created by the vertex of virtual walls 901 and 902, the location of the set point of the aerial vehicle 110 must be changed such that at least one component of the velocity of the set point of the aerial vehicle 110 is at least partially directed in the opposite direction of at least one of the virtual walls 901 and 902. Any component of the velocity of the set point the aerial vehicle 110 that is opposite the direction of at least one virtual wall in the embodiment of FIG. 9a is not restricted. In general, when the set point the aerial vehicle 110 moves out of a zone of deceleration and away from a virtual wall, its velocity is not restricted under the free-sliding mode of operation. This results in smooth motion, with no jumps in velocity, of the aerial vehicle 110 as it leaves a zone of deceleration.

The purpose of the embodiment of the free-sliding mode of operation illustrated in FIG. 9A is to demonstrate the principles of the free-sliding mode of operation. These same principles demonstrated with regard to the FIG. 9A embodiment can also be applied to any alternative NFZ encountered by the aerial vehicle 110 when operating in the free-sliding mode of operation.

Figure 9B:
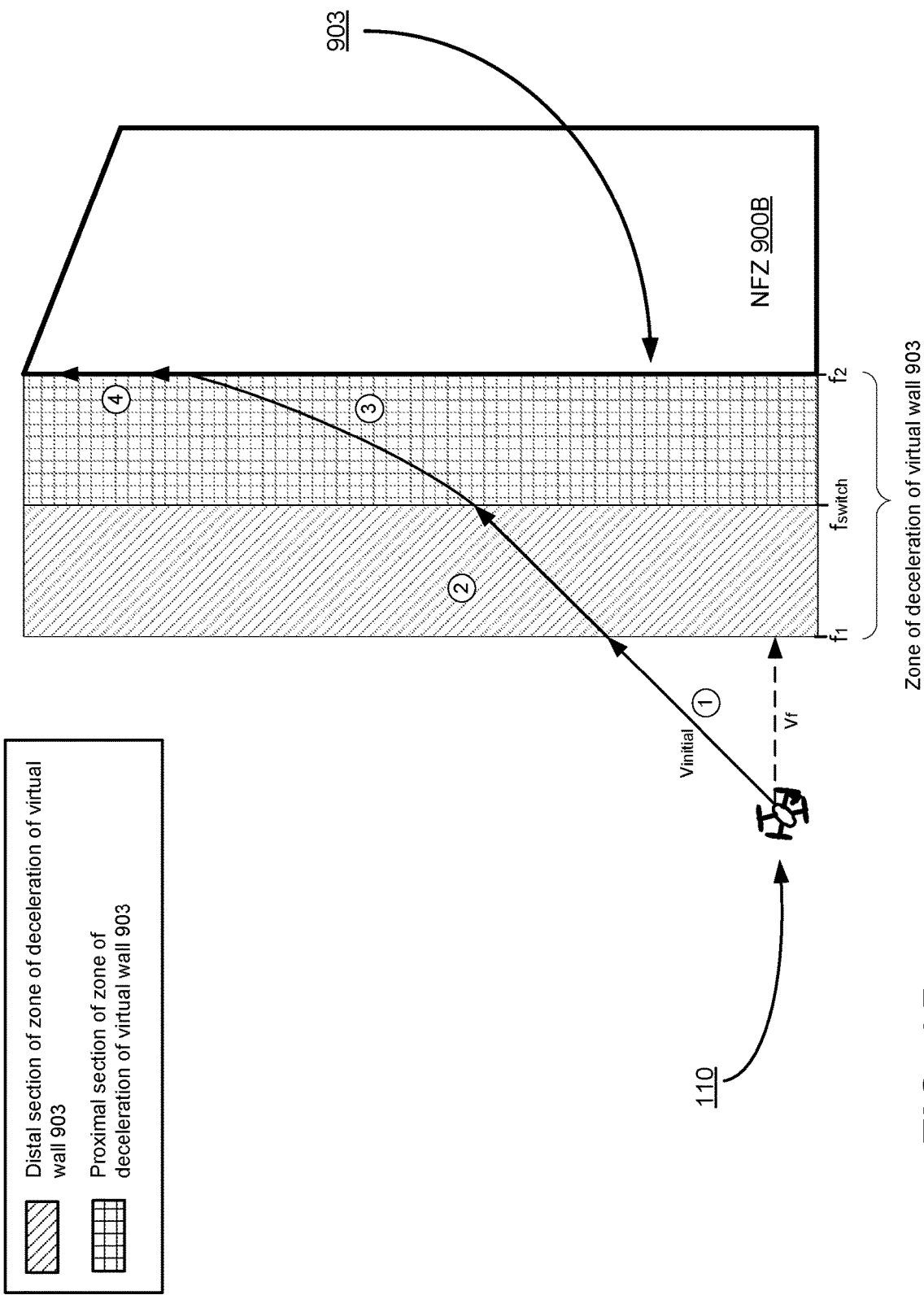
FIG. 9B illustrates a restricted-sliding mode of operation used by an aerial vehicle operating in part under remote control to navigate the area surrounding a NFZ, in accordance with one embodiment.

FIG. 9B illustrates the aerial vehicle 110 navigating the area surrounding a NFZ 900B when operating in the restricted-sliding mode of operation. Note that the restricted-sliding mode of operation described herein may apply to the operation of the aerial vehicle 110 in any alternative environment containing any alternative NFZ. For example, the aerial vehicle 110 may be within a concave corner of an NFZ rather than outside of a convex area as shown in FIG. 9B.

Under the restricted-sliding mode of operation, each virtual wall of each NFZ has a corresponding zone of deceleration. Like the zones of deceleration described with regard to FIG. 9A, a zone of deceleration under the restricted-sliding mode of operation is a boundary area that extends a specified distance from a virtual wall of a NFZ in the direction opposite the interior of the NFZ. Also similarly, the width of extension of the zone of deceleration is uniform along the entire length of a virtual wall.

One example of a zone of deceleration used by the restricted-sliding mode of operation can be seen in FIG. 9B with regard to a virtual wall 903. One noticeable discrepancy between the zones of deceleration associated with the free-sliding mode of operation and the zones of deceleration associated with the restricted-sliding mode of operation is the separation of the zones of deceleration of the restricted-sliding mode of operation into two distinct sections as seen in FIG. 9B. This distinction is discussed in further detail below.

As under the free-sliding mode of operation, under the restricted-sliding mode of operation each point along the width of a zone of deceleration is associated with a velocity scaling factor. Velocity scaling factors are used to constrain the velocity of the set point of the aerial vehicle 110 as it both approaches and escapes a virtual wall under the restricted-sliding mode of operation. As shown in FIG. 9B, $f_1$ is the velocity scaling factor associated with the point along the width of the zone of deceleration of the virtual wall 903 that is furthest from the virtual wall 903. $f_2$ is the velocity scaling factor associated with the point along the width of the zone of deceleration of the virtual wall 903 that is co-located on the virtual wall 903. Each point along the width of the zone of deceleration of the virtual wall 903 that is between the outermost point of the zone of deceleration of the virtual wall 903 and the innermost point of the zone of deceleration of the virtual wall 903 is also associated with a velocity scaling factor. Thus the width of the zone of deceleration of the virtual wall 903 is associated with an array of velocity scaling factors.

Also like the free-sliding mode of operation, under the restricted-sliding mode of operation an array of velocity scaling factors corresponding to a zone of deceleration may follow a specified distribution. For example, in FIG. 9B the velocity scaling factors within the array corresponding to the zone of deceleration of the virtual wall 903 decrease linearly from $f_1$ to $f_2$, where $f_1$ is equal to 1 and $f_2$ is equal to 0. Note that while the zone of deceleration depicted in FIG. 9B is associated with a linear array of velocity scaling factors with endpoints $f_1$ and $f_2$ equal to 1 and 0 respectively, a zone of deceleration under the restricted-sliding mode of operation may be described by any set of scaling factors, any scaling distribution, and any endpoints of the zone of deceleration.

As depicted in FIG. 9B, zones of deceleration under the restricted-sliding mode of operation are partitioned into two sections at a point along the width of the zone of deceleration. For added clarity, FIG. 9B depicts the two separated sections of the zone of deceleration of the virtual wall 903 using two different patterns. The section of the zone of deceleration of the virtual wall 903 denoted by the striped pattern will hereafter be referred to as the "distal section" of the zone of deceleration. The section of the zone of deceleration of the virtual wall 903 denoted by the cross-hatched pattern will hereafter be referred to as the "proximal section" of the zone of deceleration. Note that the zone of declaration of the virtual wall 903 encompasses both the distal and the proximal sections. The two separate sections of the zones of deceleration established under the restricted-sliding mode of operation restrict the movement of the set point of the aerial vehicle 110 in different ways. The details of these differential restrictions are explored in depth below.

The point at which the separation of the zone of deceleration occurs is hereafter referred to as the "switch point" of the zone of deceleration. Like all other points along the width of a zone of deceleration, the switch point is associated with a velocity scaling factor '$f_{switch}$' as shown in FIG. 9B. Because $f_{switch}$ is included within the array of velocity scaling factors associated with the width of a zone of deceleration, the value of $f_{switch}$ varies depending on where the switch point is located along the width of a zone of deceleration. In the embodiment depicted in FIG. 9B, the switch point is located exactly at the midpoint of the width of the zone of deceleration of the virtual wall 903. Because the array of velocity scaling factors associated with the width of that zone of deceleration of the virtual wall 903 follows a linear decreasing distribution from 1 to 0, it follows that the value of $f_{switch}$ is equal to 0.5.

The location of the switch point, and thus the value of $f_{switch}$, may be specified within the NFZ database 501, by the virtual wall behavior engine 506, or by the user of the remote controller 102 via the user interface 502. In alternative embodiments, the array of velocity scaling factors associated with the width of a zone of deceleration may adhere to any distribution and the switch point may be located at any point along the width of a zone of deceleration. Thus the value $f_{switch}$ may vary based on the location within the zone of deceleration corresponding to the switch point, and/or based on the distribution of scaling factors within the zone of deceleration.

The starting position of the set point of the aerial vehicle 110 is indicated by the UAV in FIG. 9B. From its starting position, the set point of the aerial vehicle 110 travels at a velocity $v_{initial}$ along the trajectory indicated by the corresponding arrow. For the example shown in FIG. 9B, it is assumed that $v_{initial}$ is the maximum overall possible speed of the aerial vehicle 110. $v_f$ is the component of the initial velocity of the set point of the aerial vehicle 110 that is perpendicular to the nearest virtual wall of the NFZ 900B. This nearest virtual wall is the virtual wall 903 in FIG. 9B. Note that there is no second closest virtual wall in the embodiment depicted in FIG. 9B.

When the set point of the aerial vehicle 110 enters the distal section of the zone of deceleration of the virtual wall 903 as depicted in step 2 of FIG. 9B, the velocity of the set point of the aerial vehicle 110 is restricted based on the set point's distance from the virtual wall 903. However unlike under the free-sliding mode of operation, under the restricted-sliding mode of operation, the entire magnitude of the velocity of the set point of the aerial vehicle 110 is restricted—not just a single component. Specifically, the overall velocity of the aerial vehicle 110 adheres to a maximum velocity that is determined by multiplying maximum possible velocity of the aerial vehicle 110 by the velocity scaling factor associated with the point along the width of the zone of deceleration at which the set point is located. Because the array of velocity scaling factors of the zone of deceleration of the virtual wall 903 linearly decreases from 1 to 0 from the outer edge of the zone of deceleration to the inner edge of the zone of deceleration, the overall velocity of the set point of the aerial vehicle 110 decreases linearly as the set point approaches the proximal section of the zone of deceleration of the virtual wall 903. For example, if the overall maximum velocity of the aerial vehicle 110 is 15 m/s and the set point of the aerial vehicle 110 is located at the midpoint of the distal section of the zone of deceleration where the velocity scaling factor is equal to 0.75, the overall velocity of the set point is restricted to 11.25 m/s. Because all components of the velocity are linearly restricted by the same factor, the trajectory of the set point of the aerial vehicle 110 is linear as it approaches the switch point and the proximal section of the zone of deceleration of the virtual wall 903. In other words, the magnitude of the velocity of the set point of the aerial vehicle 110 decreases, but the direction of the velocity remains constant.

As soon as the set point of the aerial vehicle 110 crosses the switch point the zone of deceleration of the virtual wall 903 and enters the proximal section of the zone of deceleration of the virtual wall 903 as depicted in step 3 of FIG. 9B, the component of the velocity of the set point of the aerial vehicle 110 that is perpendicular to the virtual wall 903 is restricted as described in the free-sliding mode of operation. However, unlike under the free-sliding mode of operation, the component of the velocity of the set point of the aerial vehicle 110 that is parallel to the virtual wall 903 also continues to be restricted based on the restriction of the parallel component when the set point is located within the distal section of the zone of deceleration, though is not restricted further.

Specifically, the component of the velocity perpendicular to the virtual wall 903 adheres to a maximum velocity that is determined by multiplying the maximum possible velocity of the aerial vehicle 110 by the velocity scaling factor associated with the point along the width of the zone of deceleration at which the set point is located. Because the array of velocity scaling factors of the zone of deceleration of the virtual wall 903 linearly decreases from 1 to 0 from the outer edge of the zone of deceleration to the inner edge of the zone of deceleration, the component of the velocity perpendicular to the virtual wall 903 decreases linearly as the set point approaches the virtual wall 903. For example, if the overall maximum velocity of the aerial vehicle 110 is 15 m/s and the set point of the aerial vehicle 110 is located at the midpoint of the proximal section of the zone of deceleration where the velocity scaling factor is equal to 0.25, the component of the velocity perpendicular to the virtual wall 903 is restricted to 3.75 m/s.

Additionally, the component of the velocity that is parallel to the virtual wall 903 adheres to a constant maximum velocity that is determined by multiplying the maximum possible velocity of the aerial vehicle 110 by the velocity scaling factor of the switch point, $f_{switch}$. This restriction on the parallel component of the velocity of the set point of the aerial vehicle 110 remains constant throughout the entire proximal section of the zone of deceleration of the virtual wall 903. For example, if the overall maximum velocity of the aerial vehicle 110 is 15 m/s and the switch point of the aerial vehicle 110 is located at the midpoint of the zone of deceleration where $f_{switch}$ is equal to 0.5, the component of the velocity parallel to the virtual wall 903 is restricted to 7.5 m/s at any point within the proximal section of the zone of deceleration of the virtual wall 903. Because the component of the velocity perpendicular to the virtual wall 903 is linearly restricted according to its location but the component of the velocity parallel to the virtual wall 903 is restricted at a constant value, the trajectory of the set point of the aerial vehicle 110 within the proximal section of the zone of deceleration is asymptotic as it approaches the virtual wall 903.

Finally, when the set point of the aerial vehicle 110 reaches the edge of the zone of deceleration that is co-located with the virtual wall 903, the velocity scaling factor $f_2$ is equal to 0 and thus the component of the velocity perpendicular to the virtual wall 903 also becomes zero. As a result, the aerial vehicle 110 simply travels parallel to the virtual wall 903 at a velocity that remains restricted in the manner described above. Because there is no second closest virtual wall in the embodiment depicted in FIG. 9B, the aerial vehicle 110 does not get stuck in a convex NFZ corner as in FIG. 9A. Instead, the aerial vehicle 110 is able to continue traveling parallel to the virtual wall 903. However using the same principle outlined above, the restricted-sliding mode of operation is able to function in any alternative environment, including one in which a corner similar to the one depicted in FIG. 9A is present.

Note that the velocity of the set point of the aerial vehicle 110 in both the distal and proximal sections of the zone of deceleration of the virtual wall 903 cannot exceed the maximum velocity determined by the relevant velocity scaling factor. However the velocity component(s) of the set point of the aerial vehicle 110 can be less than the maximum velocity. For example, if set point of the aerial vehicle 110 moves at a constant velocity of 3.75 m/s in the direction perpendicular to the virtual wall 903 under the conditions outlined above, its velocity will not change until it passes the midpoint of the proximal section of the zone of deceleration of the virtual wall 903 where the velocity is restricted to a maximum of 3.75 m/s.

In order to leave the zone of deceleration of the virtual wall 903, the location of the set point of the aerial vehicle 110 must be changed such that at least one component of the velocity of the set point of the aerial vehicle 110 is at least partially directed in the opposite direction of the virtual wall 903. In some embodiments, under the restricted-sliding mode of operation, any component of the escape velocity of the set point of the aerial vehicle 110 that is perpendicular to the virtual wall 903 is not restricted. However, any component of escape velocity of the set point of the aerial vehicle 110 that is parallel to the virtual wall 903 is restricted to follow a parabolic trajectory (where the scaling of the parallel velocity component decreases with an increase in distance from the virtual wall).

In some embodiments, under the restricted-sliding mode of operation, when leaving the zone of deceleration, the overall magnitude of the velocity of the set point is constrained to a maximum velocity ($V_E$). $V_E$ can be dependent on the trajectory of the set point and the distance of the set point to the virtual wall 903. In some embodiments, $V_E$ can be computed by superimposing an ellipse over the set point such that a length of the semi-minor axis of the ellipse is selected based on the distance of the set point to the virtual wall, and such that the semi-major axis of the ellipse is set to 1. $V_E$ can then be computed based on the distance from the center of the ellipse to the location on the ellipse boundary where the trajectory vector of the set point crosses the ellipse boundary. For instance, if the trajectory of the set point is exactly perpendicular to the virtual wall and to the outside of the deceleration zone, then $V_E$ is not constrained at all. Similarly, if the trajectory of the set point is parallel to the virtual wall, $V_E$ will be constrained to 0 if the set point is located at the virtual wall, will be constrained to 50% of the maximum set point velocity if the set point is located in the middle of the deceleration zone, and will be constrained to the maximum set point velocity if the set point is located on the outer border of the deceleration zone. Finally, if the trajectory of the set point is between parallel to the virtual wall and perpendicular to the virtual wall, the $V_E$ is constrained based on the distance of the set point to the intersection of the boundary of the ellipse and the trajectory vector of the set point. Constraining exit velocity as described in this embodiment beneficially reduces or eliminates discontinuities in velocity as the set point navigates towards and then away from a virtual wall. It should be noted that in some embodiments, the exit velocity of the set point can be constrained in other ways, for instance such that the overall magnitude of the set point velocity is constrained, such that only the component of the set point velocity parallel to the virtual wall is constrained, based on the trajectory of the set point relative to the virtual wall, based on the distance of the set point to the virtual wall or within the deceleration zone, or based on any other suitable factor.

The purpose of the embodiment of the restricted-sliding mode of operation illustrated in FIG. 9B is to demonstrate the principles of the restricted-sliding mode of operation. These same principles demonstrated with regard to the FIG. 9B embodiment can also be applied to any alternative NFZ encountered by the aerial vehicle 110 when operating in the restricted-sliding mode of operation.

Figure 9C:
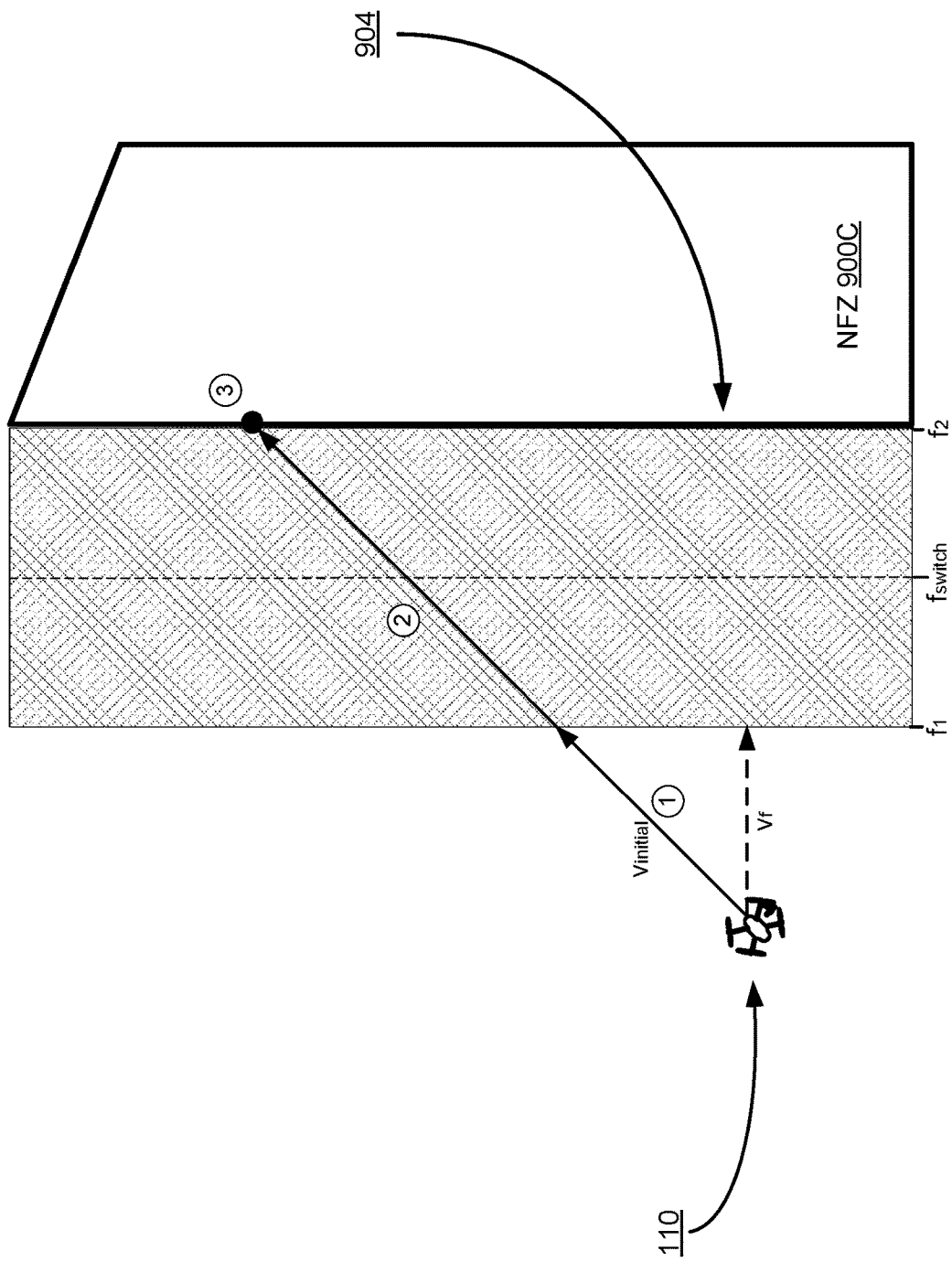
FIG. 9C illustrates a non-sliding mode of operation used by a remote controlled aerial vehicle to navigate the area surrounding a NFZ, in accordance with one embodiment.

FIG. 9C illustrates the aerial vehicle 110 navigating the area surrounding a NFZ 900C when operating in the non-sliding mode of operation. Note that the restricted-sliding mode of operation described herein may apply to the operation of the aerial vehicle 110 in any alternative environment containing any alternative NFZ. For example, the aerial vehicle 110 may be within a concave corner of an NFZ rather than outside of a convex area as shown in FIG. 9C.

Under the non-sliding mode of operation, each virtual wall of each NFZ has a corresponding zone of deceleration. Like the zones of deceleration described with regard to FIGS. 9A and 9B, a zone of deceleration under the non-sliding mode of operation is a boundary area that extends a specified distance from a virtual wall of a NFZ in the direction opposite the interior of the NFZ. Also similarly, the width of extension of the zone of deceleration is uniform along the entire length of a virtual wall. One example of a zone of deceleration used by the non-sliding mode of operation can be seen in FIG. 9C. The zone of deceleration of a virtual wall 904 is indicated by the cross-hatched area.

Each point along the width of a zone of deceleration is associated with a velocity scaling factor. Velocity scaling factors are used to constrain the set point of velocity of the aerial vehicle 110 as it both approaches and escapes a virtual wall under the non-sliding mode of operation. As shown in FIG. 9C, $f_1$ is the velocity scaling factor associated with the point along the width of the zone of deceleration of the virtual wall 904 that is furthest from the virtual wall 904. $f_2$ is the velocity scaling factor associated with the point along the width of the zone of deceleration of the virtual wall 904 that is co-located on the virtual wall 904. Each point along the width of the zone of deceleration of the virtual wall 904 that is between the outermost point of the zone of deceleration of the virtual wall 904 and the innermost point of the zone of deceleration of the virtual wall 904 is also associated with a velocity scaling factor. Thus the width of the zone of deceleration of the virtual wall 904 is associated with an array of velocity scaling factors.

An array of velocity scaling factors corresponding to a zone of deceleration of the non-sliding mode of operation may follow a specified distribution. In FIG. 9C the velocity scaling factors within the array corresponding to the zone of deceleration of the virtual wall 904 decrease linearly from $f_1$ to $f_2$, where $f_1$ is equal to 1 and $f_2$ is equal to 0. Note that while the zone of deceleration depicted in FIG. 9C is associated with a linear array of velocity scaling factors with endpoints $f_1$ and $f_2$ equal to 1 and 0 respectively, a zone of deceleration may be described by any set of scaling factors, any scaling distribution, and any endpoints of the zone of deceleration.

FIG. 9C depicts the zone of deceleration of the virtual wall 904 as partitioned into two sections by a dashed line beginning at a point along the width of the zone of deceleration of the virtual wall 904. As under the restricted-sliding mode of operation depicted in FIG. 9B, the point at which this separation of the zone of deceleration occurs is the "switch point" of the zone of deceleration. Like all other points along the width of a zone of deceleration, the switch point is associated with a velocity scaling factor '$f_{switch}$' as shown in FIG. 9C. Because $f_{switch}$ is a member of the array of velocity scaling factors associated with the width of a zone of deceleration, the value of $f_{switch}$ varies depending on where the switch point is located along the width of a zone of deceleration. In the embodiment depicted in FIG. 9C, the switch point is located exactly at the midpoint of the width of the zone of deceleration of the virtual wall 904. Because the array of velocity scaling factors associated with the width of that zone of deceleration of the virtual wall 904 follows a linear decreasing distribution from 1 to 0, it follows that the value of $f_{switch}$ is equal to 0.5.

The location of the switch point, and thus the value of $f_{switch}$, may be specified within the NFZ database 501, by the virtual wall behavior engine 506, or by the user of the remote controller 102 via the user interface 502. In alternative embodiments, the array of velocity scaling factors associated with the width of a zone of deceleration may adhere to any distribution and the switch point may be located at any point along the width of a zone of deceleration. Thus the value $f_{switch}$ may vary.

Unlike under the restricted-sliding mode of operation, under the non-sliding mode of operation, the partitioning of a zone of deceleration does not affect the velocity of the set point of the aerial vehicle 110 as it approaches a virtual wall. Rather, the partitioning of the zone of deceleration restricts the velocity of the set point of the aerial vehicle 110 as it leaves the zone of deceleration. This impact on the escape velocity of the set point of the aerial vehicle 110 is described in further detail below.

The starting position of the set point of the aerial vehicle 110 is indicated by the UAV icon in FIG. 9C. From its starting position, the set point of the aerial vehicle 110 travels at a velocity $v_{initial}$ along the trajectory indicated by the corresponding arrow. For the example shown in FIG. 9C, it is assumed that $v_{initial}$ is the maximum overall possible speed of the aerial vehicle 110. $v_f$ is the component of the initial velocity of the set point of the aerial vehicle 110 that is perpendicular to the nearest virtual wall of the NFZ 900C. This nearest virtual wall is the virtual wall 904 in FIG. 9C. Note that there is no second closest virtual wall in the embodiment depicted in FIG. 9C.

When the set point of the aerial vehicle 110 enters the zone of deceleration of the virtual wall 904 as depicted in step 2 of FIG. 9C, the velocity of the set point of the aerial vehicle 110 is restricted based on the set point's distance from the virtual wall 904. Specifically, the overall velocity of the aerial vehicle 110 adheres to a maximum velocity that is determined by multiplying the maximum possible velocity of the aerial vehicle 110 by the velocity scaling factor associated with the point along the width of the zone of deceleration at which the set point is located. Because the array of velocity scaling factors of the zone of deceleration of the virtual wall 904 linearly decreases from 1 to 0 from the outer edge of the zone of deceleration to the inner edge of the zone of deceleration, the overall velocity of the set point of the aerial vehicle 110 decreases linearly as the set point approaches the virtual wall 904. For example, if the overall maximum velocity of the aerial vehicle 110 is 15 m/s and the set point of the aerial vehicle 110 is located at the midpoint of the zone of deceleration where the velocity scaling factor is equal to 0.5, the overall velocity is restricted to 7.5 m/s. Because all components of the velocity are linearly restricted by the same factor, the trajectory of the set point of the aerial vehicle 110 is linear as it approaches the virtual wall 904. In other words, the magnitude of the velocity of the set point of the aerial vehicle 110 decreases, but the direction of the velocity remains constant.

Finally, when the set point of the aerial vehicle 110 reaches the edge of the zone of deceleration that is co-located with the virtual wall 904, the velocity scaling factor $f_2$ is equal to 0 and thus the overall velocity of the set point of aerial vehicle also becomes zero. As a result, the aerial vehicle 110 simply hovers at the point along the virtual wall 904 where it came to a stop until the location of its set point is changed. In other words, no sliding along the virtual wall 904 occurs. This final step is depicted as step 3 of FIG. 9C.

In order to leave the zone of deceleration of the virtual wall 904, the location of the set point of the aerial vehicle 110 must be changed such that at least one component of the velocity of the set point of the aerial vehicle 110 is at least partially directed in the opposite direction of the virtual wall 904. Under the non-sliding mode of operation, when the set point is located between $f_2$ and $f_{switch}$, both the component of the set point velocity that is parallel to the virtual wall and the component of the set point velocity that is perpendicular to the virtual wall is parabolically scaled based on a distance from the virtual wall. Likewise, when the set point is located between $f_{switch}$ and $f_1$, the component of the set point velocity that is parallel to the virtual continues to be parabolically scaled with distance to the virtual wall, while the component of the set point velocity that is perpendicular to the virtual wall is not restricted or otherwise scaled.

In some embodiments, under the non-slide mode of operation, when leaving the zone of deceleration, the overall magnitude of the velocity of the set point is constrained to a maximum velocity ($V_E$). As described above with regards to the restricted-sliding mode of operation, $V_E$ can be dependent on the trajectory of the set point and the location of the set point within the deceleration zone. As also described above, an ellipse can be superimposed over the set point such that a length of the semi-minor axis of the ellipse is selected based on the distance of the set point to the virtual wall, and such that the semi-major axis of the ellipse is set to 1, and such that $V_E$ is constrained based on a distance between the set point and the intersection of the ellipse boundary and the set point trajectory vector. However, under the non-slide mode of operation, the ellipse can transition between a fixed semi-major axis and a shrinking semi-major axis (based on a distance to the virtual wall or a distance to a deceleration zone boundary) at the distance $f_{switch}$. Such an embodiment beneficially reduces or eliminates discontinuities in motion or velocity. As noted above, in some embodiments, the exit velocity of the set point can be constrained in other ways, for instance such that the overall magnitude of the set point velocity is constrained, such that only the component of the set point velocity parallel to the virtual wall is constrained, based on the trajectory of the set point relative to the virtual wall, based on the distance of the set point to the virtual wall or relative to the distance $f_{switch}$, or based on any other suitable factor.

Note that in the cases described above with regard to the non-sliding mode of operation, the velocity of the set point of the aerial vehicle 110 cannot exceed the maximum velocity determined by the relevant velocity scaling factor. However the velocity of the set point of the aerial vehicle 110 can be less than the maximum velocity. For example, if set point of the aerial vehicle 110 moves at a constant velocity of 7.5 m/s under the conditions outlined above, its velocity will not change until it passes the midpoint of the zone of deceleration of the virtual wall 904 where the velocity is restricted to a maximum of 7.5 m/s.

The purpose of the embodiment of the non-sliding mode of operation illustrated in FIG. 9C is to demonstrate the principles of the non-sliding mode of operation. These same principles demonstrated with regard to the FIG. 9C embodiment can also be applied to any alternative NFZ encountered by the aerial vehicle 110 when operating in the non-sliding mode of operation.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed remote controller, the user interface thereof, and associated systems. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An unmanned aerial vehicle ("UAV"), the UAV comprising:
   an electric speed controller interfaced with thrust motors of the UAV; and
   a flight controller configured to:
      determine a geographic location and a velocity of the UAV, wherein the velocity includes a first component and a second component;
      determine a distance between the geographic location of the UAV and a closest segment of a no-fly-zone;
      in response to the distance being less than a threshold distance, control a speed and thrust applied by the thrust motors through the electric speed controller to modify the first component and the second component of the velocity of the UAV based on the distance; and
      override a user input received via a user interface so that the UAV is moved relative to the closest segment of a no-fly-zone according to instructions from the flight controller.

2. The UAV of claim 1, further configured to:
   in response to the distance being less than the threshold distance, modify a trajectory of the UAV such that the UAV does not cross the closest segment of the no-fly-zone.

3. The UAV of claim 2, wherein modifying the trajectory of the UAV comprises reducing the second component of the velocity of the UAV based on the distance without reducing the first component of the velocity of the UAV.

4. The UAV of claim 1, further comprising:
   a camera; and
   a gimbal connecting the camera to the UAV.

5. The UAV of claim 4, further comprising:
a gimbal interface located between the gimbal and the UAV and directly connected to the UAV.

6. The UAV of claim 5, wherein the gimbal interface is in communication with the flight controller and the gimbal interface relays data to a gimbal controller that controls the gimbal and the camera.

7. The UAV of claim 2, wherein modifying the trajectory of the UAV comprises:
modifying the first component and the second component of the velocity of the UAV if the distance is greater than a second threshold distance; and
modifying the second component of the velocity of the UAV if the distance is less than the second threshold distance, without further reducing the first component of the velocity of the UAV.

8. The UAV of claim 1, wherein the flight controller controls a set point that includes a location, speed, and trajectory of the UAV.

9. The UAV of claim 8, wherein the set point is a mobile point in space that the UAV attempts to reach through movement, and once the UAV reaches the set point, the UAV is configured to hover at the set point until new instructions from the flight controller are received.

10. The UAV of claim 1, further configured to:
receive an input instructing the UAV to move in a direction away from the closest segment of the no-fly-zone, wherein one or more of the first component and the second component of the velocity of the UAV is limited based on the distance.

11. A system comprising:
a flight controller comprising:
a navigation engine configured to:
determine a set point of an unmanned aerial vehicle (UAV), wherein the set point includes a velocity of the UAV, which includes a first component and a second component corresponding to a no-fly-zone; and
identify a state of the set point of the UAV in real time; and
a distance evaluation engine configured to:
determine a shortest distance between the set point of the UAV and a closest portion of the no-fly zone,
wherein in response to the shortest distance being less than a threshold distance, the navigation engine is configured to reduce both the first component and the second component of the velocity of the UAV by controlling a speed and thrust applied by thrust motors of the UAV.

12. The system of claim 11, further comprising:
a virtual wall behavior engine that instructs movement of the UAV to change speed, direction, trajectory, or location of the set point of the aerial vehicle.

13. The system of claim 12, wherein the navigation engine receives instructions from the virtual wall behavior engine and changes the speed, the direction, the trajectory, or the location of the set point of the aerial vehicle, and
wherein instructions from the virtual wall behavior engine override conflicting commands from a user interface.

14. The system of claim 11, further comprising:
a no-fly zone database that stores information regarding all no-fly zones (NFZs) in a specified geographic area.

15. The system of claim 14, wherein the no-fly zone database stores coordinates of the specified geographic area so that the distance evaluation engine and the navigation engine control the UAV within the coordinates.

16. An electronic control system comprising:
a flight controller in communication with an unmanned aerial vehicle (UAV) and including instructions regarding a location, a speed, and a trajectory, wherein the flight controller provides a set point to the UAV;
an electronic speed controller (ESC) in communication with one or more thrust motors and configured to control a speed and a thrust of the one or more thrust motors;
a gimbal interface in communication with a gimbal and the flight controller to control movements of the gimbal;
a sensor subsystem comprising navigational components to determine a location and orientation of the UAV;
a power subsystem configured to manage and supply power within the UAV;
a camera interface configured to interface with an image capture device; and
a communication subsystem configured to communicate with a remote controller.

17. The electronic control system of claim 16, wherein the ESC is in communication with the flight controller and the one or more thrust motors so that the speed and the thrust of the one or more thrust motors are adjusted to control movements of the UAV.

18. The electronic control system of claim 16, wherein the gimbal interface communicates with the flight controller to move the gimbal as the UAV moves to capture images.

19. The electronic control system of claim 16, further comprising:
A no-fly zone database within the flight controller, wherein the no-fly zone database provides geographic coordinates and locations to the UAV to avoid specified locations within a geographic area.

20. The electronic control system of claim 19, wherein the no-fly zone database is in communication with a server so that the no-fly zone is updatable in real time.

* * * * *